United States Patent
King et al.

(10) Patent No.: US 12,530,970 B2
(45) Date of Patent: Jan. 20, 2026

(54) COLLISION AVOIDANCE SYSTEM

(71) Applicant: Zoox, Inc., Foster City, CA (US)

(72) Inventors: Andrew Lewis King, Los Altos, CA (US); Kristofer Sven Smeds, Mountain View, CA (US); Robert Edward Somers, Sunnyvale, CA (US); Jefferson Bradfield Packer, San Francisco, CA (US); Marc Wimmershoff, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 204 days.

(21) Appl. No.: 16/232,863

(22) Filed: Dec. 26, 2018

(65) Prior Publication Data

US 2020/0211394 A1 Jul. 2, 2020

(51) Int. Cl.
G08G 1/16 (2006.01)
G05D 1/00 (2024.01)

(52) U.S. Cl.
CPC ........... *G08G 1/166* (2013.01); *G05D 1/0077* (2013.01); *G05D 1/0289* (2013.01)

(58) Field of Classification Search
CPC ............ G06K 9/00; G08G 1/16; G08G 1/166; G08G 5/04; G05D 1/77; G05D 1/289; G05D 2201/213; G05D 1/212; G05D 1/88; G05D 1/214; G05D 1/221; G05D 1/274; G05D 1/61; G05D 1/00; G01S 5/00; G01S 19/39; G01S 13/93; H04W 4/40;

(Continued)

(56) References Cited

U.S. PATENT DOCUMENTS 6,226,389 B1 5/2001 Lemelson et al.
6,393,362 B1 5/2002 Burns
(Continued)

FOREIGN PATENT DOCUMENTS

CN 104228836 12/2014
CN 108216259 6/2018
(Continued)

OTHER PUBLICATIONS

PCT Search Report and Written Opinion mailed on Apr. 20, 2020 for PCT Application No. PCT/US2019/067276, 11 pages.
(Continued)

*Primary Examiner* — Scott A Browne
*Assistant Examiner* — Terry C Buse
(74) *Attorney, Agent, or Firm* — Lee & Hayes, P.C.

(57) ABSTRACT

A vehicle may include a primary system for generating data to control the vehicle and a secondary system that validates the data and/or other data to avoid collisions. For example, the primary system may localize the vehicle, detect an object around the vehicle, predict an object trajectory, and generate a trajectory for the vehicle. The secondary system may localize the vehicle, detect an object around the vehicle, predict an object trajectory, and evaluate a trajectory generated by the primary system. The secondary system may also monitor components of the vehicle to detect an error. If the secondary system detects an error with a trajectory generated by the primary system and/or an error with a component of the vehicle, the secondary system may cause the vehicle to perform a maneuver, such as decelerating, changing lanes, swerving, etc.

20 Claims, 12 Drawing Sheets

(58) Field of Classification Search
CPC .... B60W 30/09; B60W 50/14; B60W 30/956; B60W 30/953; G01C 23/00; B60Q 1/525; B60Q 5/06; B60R 21/134

See application file for complete search history.

(56) References Cited

U.S. PATENT DOCUMENTS

| | | | |
|---|---|---|---|
| 9,460,622 | B1 | 10/2016 | Ferguson et al. |
| 9,606,539 | B1 | 3/2017 | Kentley et al. |
| 9,630,619 | B1 | 4/2017 | Kentley et al. |
| 9,731,729 | B2 | 8/2017 | Solyom et al. |
| 10,065,638 | B1 | 9/2018 | Wood et al. |
| 10,074,279 | B1 | 9/2018 | Xu |
| 10,235,882 | B1 | 3/2019 | Aoude et al. |
| 10,324,463 | B1 | 6/2019 | Konrardy et al. |
| 10,481,603 | B2 | 11/2019 | Pink et al. |
| 10,896,116 | B1* | 1/2021 | Gabrovski .......... G06F 11/3616 |
| 11,126,763 | B1* | 9/2021 | Gabrovski ............ G05D 1/0088 |
| 11,866,001 | B1* | 1/2024 | Patnaik ............... B60W 60/007 |
| 2007/0080825 | A1 | 4/2007 | Shiller |
| 2008/0065328 | A1 | 3/2008 | Eidehall et al. |
| 2008/0312832 | A1 | 12/2008 | Greene et al. |
| 2009/0299593 | A1 | 12/2009 | Borchers |
| 2010/0292871 | A1 | 11/2010 | Schultz et al. |
| 2014/0074388 | A1 | 3/2014 | Bretzigheimer et al. |
| 2016/0163198 | A1 | 6/2016 | Dougherty |
| 2016/0339910 | A1 | 11/2016 | Jonasson et al. |
| 2017/0069214 | A1* | 3/2017 | Dupray .................... G08G 5/56 |
| 2017/0115661 | A1* | 4/2017 | Pink .................... B60W 50/029 |
| 2017/0248964 | A1 | 8/2017 | Kentley et al. |
| 2018/0261093 | A1* | 9/2018 | Xu ........................ G05D 1/0278 |
| 2018/0292834 | A1 | 10/2018 | Kindo |
| 2018/0348767 | A1 | 12/2018 | Jafari Tafti et al. |
| 2018/0373252 | A1* | 12/2018 | Steiner .................... G06F 11/16 |
| 2019/0079529 | A1 | 3/2019 | Kamata |
| 2019/0086916 | A1 | 3/2019 | Choi |
| 2019/0111921 | A1 | 4/2019 | Hehn et al. |
| 2019/0213103 | A1* | 7/2019 | Morley ............... G06F 11/3608 |
| 2019/0220012 | A1 | 7/2019 | Zhang et al. |
| 2019/0250617 | A1 | 8/2019 | Ford et al. |
| 2019/0250622 | A1 | 8/2019 | Nister et al. |
| 2019/0263423 | A1* | 8/2019 | Wakabayashi ...... B60W 30/095 |
| 2020/0050536 | A1* | 2/2020 | Nygaard ............. G06F 11/3696 |
| 2020/0117206 | A1* | 4/2020 | Egnor .................. G05D 1/0223 |
| 2020/0125989 | A1* | 4/2020 | Sucan ............... B60W 50/0098 |
| 2020/0148201 | A1 | 5/2020 | King et al. |
| 2020/0160535 | A1 | 5/2020 | Ali Akbarian et al. |
| 2020/0189573 | A1 | 6/2020 | King et al. |
| 2021/0157882 | A1* | 5/2021 | Liu ...................... G06F 11/3698 |
| 2021/0286360 | A1* | 9/2021 | Ding ...................... G06N 5/022 |
| 2021/0365029 | A1* | 11/2021 | Molina Cabrera .... G05D 1/027 |
| 2022/0055616 | A1 | 2/2022 | King et al. |
| 2022/0379883 | A1* | 12/2022 | Bruno ............... B60W 30/0956 |

FOREIGN PATENT DOCUMENTS

| | | |
|---|---|---|
| CN | 108290540 | 7/2018 |
| CN | 108292356 | 7/2018 |
| DE | 102008063033 | 9/2009 |
| DE | 102010005290 | 8/2010 |
| DE | 102014212384 A1 | 12/2015 |
| JP | 2009101733 A | 5/2009 |
| JP | 2010228740 A | 10/2010 |
| JP | 2016037149 A | 3/2016 |
| JP | 2016038689 A | 3/2016 |
| JP | 2017102907 A | 6/2017 |
| JP | 2017523074 A | 8/2017 |
| JP | 2018081080 A | 5/2018 |
| JP | 2018176879 A | 11/2018 |
| RU | 2012126039 A | 12/2013 |
| WO | 2015068249 A1 | 5/2015 |
| WO | WO2017079349 A1 | 5/2017 |
| WO | WO2018156451 A1 | 8/2018 |

OTHER PUBLICATIONS

PCT Search Report and Written Opinion mailed on Apr. 3, 2020 for PCT Application No. PCT/US2019/065165, 27 pages.
Berntorp, "Path Planning and Integrated Collision Avoidance for Autonomous Vehicles," 2017 American Control Conference, Seattle, WA, May 24-26, 2017, pp. 4023-4029.
Non Final Office Action dated Aug. 28, 2020 for U.S. Appl. No. 16/218,182, "Collision Avoidance System With Trajectory Validation," King, 8 pages.
PCT Search Report and Written Opinion mailed on Mar. 12, 2020 for PCT Application No. PCT/US2019/060085, 9 pages.
U.S. Appl. No. 15/622,905, filed Jun. 14, 2017, Douillard, et al., "Voxel Based Ground Plane Estimation and Object Segmentation", 74 pages.
U.S. Appl. No. 15/820,245, filed Nov. 21, 2017, Pfeiffer, et al., "Sensor Data Segmentation", 70 pages.
U.S. Appl. No. 15/833,715, filed Dec. 6, 2017, Kobilarov, et al., "Trajectory Prediction of Third-Party Objects Using Temporal Logic and Tree Search", 92 pages.
U.S. Appl. No. 16/189,726, filed Nov. 13, 2018, King, et al., "Perception Collision Avoidance", 53 pages.
U.S. Appl. No. 16/218,182, filed Dec. 12, 2018, King, et al., "Collision Avoidance System With Trajectory Validation", 69 pages.
Extended European Search Report mailed Jul. 6, 2022 for European Patent Application No. 19884960.6, a foreign counterpart to U.S. Pat. No. 11,124,185, 8 pages.
Office Action for U.S. Appl. No. 17/461,647, mailed on Feb. 7, 2023, King, "Collision Avoidance System With Trajectory Validation", 10 pages.
Japanese Office Action mailed Dec. 26, 2023 for Japanese Application No. 2021-537838, a foreign counterpart to U.S. Appl. No. 16/232,863, 6 pages.
Office Action for U.S. Appl. No. 16/189,726, mailed on Mar. 18, 2021, King, "Perception Collision Avoidance", 18 pages.
Chinese Office Action mailed Apr. 13, 2023 for Chinese patent application No. 201980074461.4, a foreign counterpart of U.S. Pat. No. 11,124,185, 44 pages.
European Office Action mailed Apr. 11, 2023 for European patent application No. 19836231.1, a counterpart foreign application of U.S. Pat. No. 11,104,332, 6 pages.
Japanese Office Action mailed Oct. 17, 2023 for Japanese Application No. 2021-525861, a foreign counterpart to U.S. Pat. No. 11,124,185, 11 pages.
European Office Action mailed Jul. 24, 2023 for European Patent Application No. 19839725.9, a foreign counterpart to U.S. Appl. No. 16/232,863, 6 pages.
Japanese Office Action mailed Jun. 27, 2023 for Japanese Patent Application No. 2021-537838, a foreign counterpart to U.S. Appl. No. 16/232,863, 16 pages.
Japanese Office Action mailed Nov. 14, 2023 for Japanese Application No. 2021-533586, a foreign counterpart to U.S. Pat. No. 11,104,332, 9 pages.
Office Action for Japanese Application No. 2021-537838, Dated Jun. 11, 2024, 6 pages.
Office Action for European Application No. 19884960.6, Dated Jun. 19, 2024, 4 pages.
Office Action for Japanese Application No. 2021-525861, dated Apr. 2, 2024, 5 pages.
Office Action for Japanese Application No. 2021-533586, dated Apr. 9, 2024, 5 pages.
Office Action for Japanese Application No. 2021-525861, Dated Sep. 3, 2024, 10 pages.
Summons for Oral Proceedings for European Application No. 19836231.1, Dated Jan. 30, 2025, 8 pages.
Examination Report for European Application No. 19836231.1, Dated Apr. 14, 2025, 7 pages.

* cited by examiner

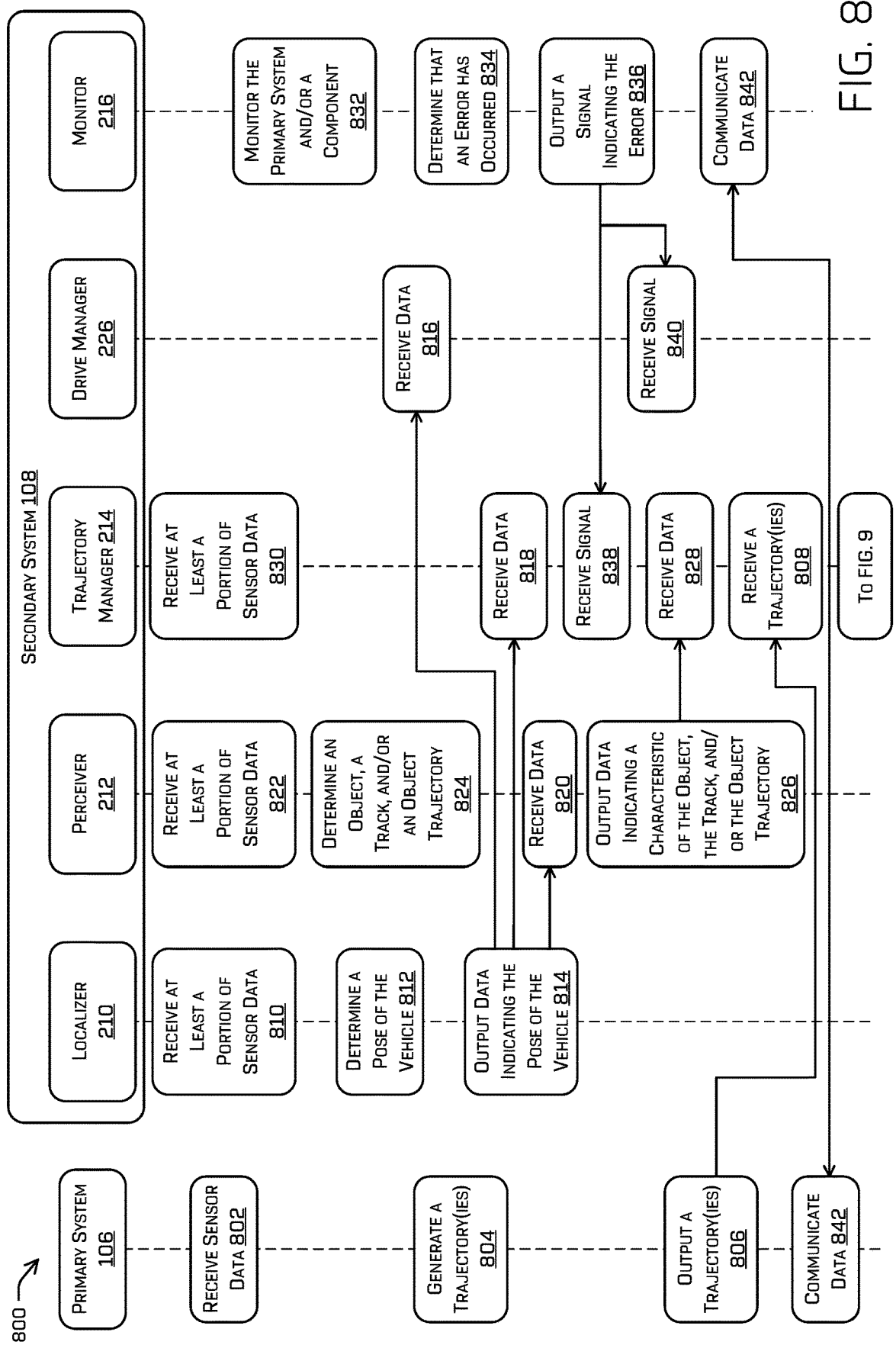

COLLISION AVOIDANCE SYSTEM

BACKGROUND

Safety of passengers in a vehicle and other people or objects in proximity to the vehicle is of the utmost importance. Such safety is often predicated on an accurate detection of a potential collision and timely deployment of a safety measure. While autonomous vehicles are often implemented with systems that have highly effective collision detection systems, these systems may be inoperable or ineffective on rare occasions. For instance, an error may develop in a relatively long, and potentially complex, processing pipeline for a system on a vehicle, causing the vehicle to maneuver in an unsafe manner.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 8 illustrates an example process that may be performed by various components of a primary system and/or a secondary system.

DETAILED DESCRIPTION

Figure 1:
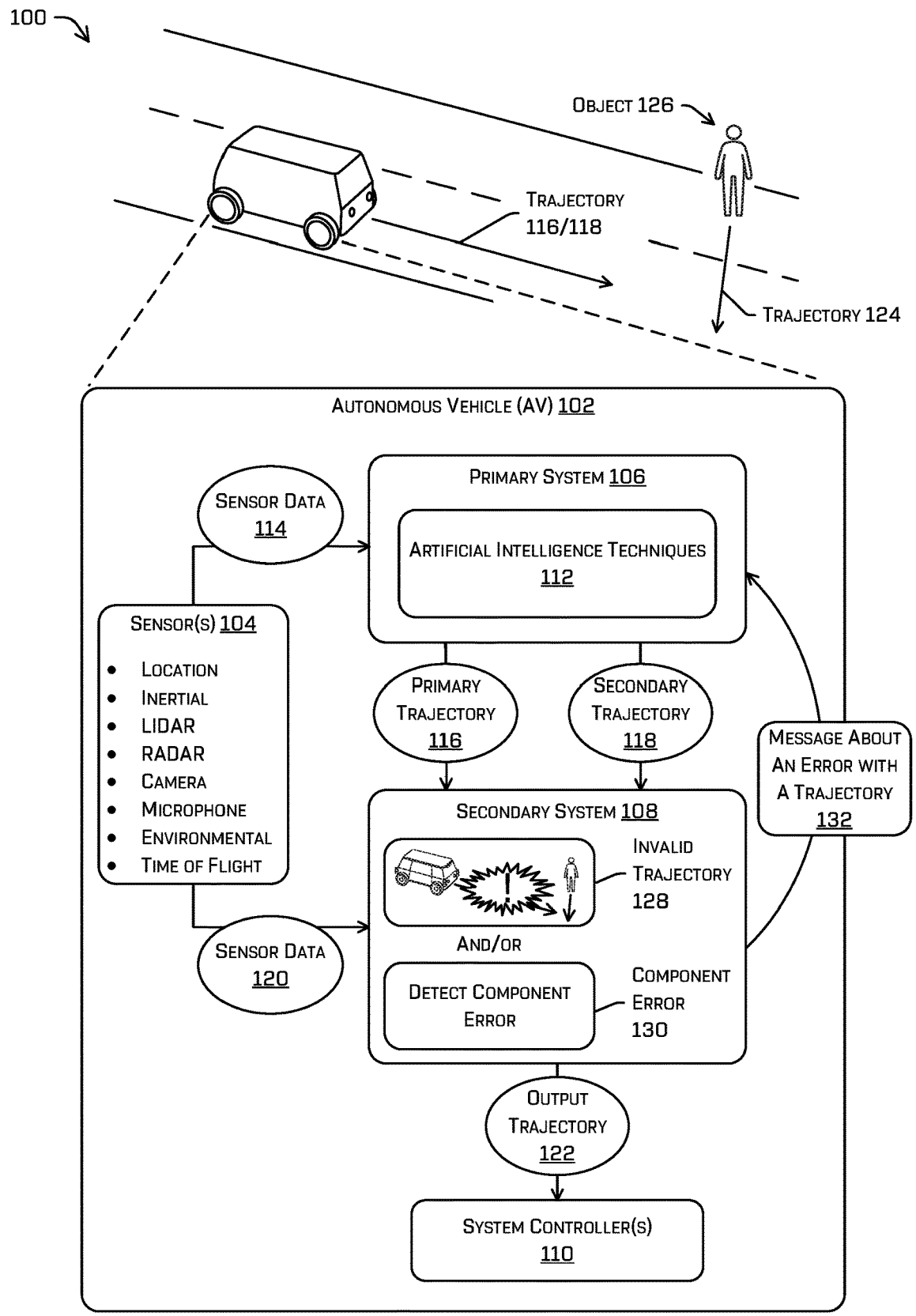
FIG. 1 illustrates an example environment in which the techniques discussed herein may be implemented.

This disclosure is directed to a vehicle including a primary system for generating data to control the vehicle and a secondary system that validates the data and/or other data to avoid collisions. For example, the primary system may localize the vehicle, detect an object around the vehicle, segment sensor data, determine a classification of the object, predict an object trajectory, generate a trajectory for the vehicle, and so on. The secondary system may independently localize the vehicle, detect an object around the vehicle, predict an object trajectory, evaluate a trajectory generated by the primary system, and so on. In examples, the secondary system may also monitor components of the vehicle to detect an error. If the secondary system detects an error with a trajectory generated by the primary system and/or an error with a component of the vehicle, the secondary system may cause the vehicle to perform a maneuver, such as decelerating, changing lanes, swerving, etc. In examples, the secondary system may send information to the primary system (e.g., information regarding a potential collision). In many examples, the techniques discussed herein may be implemented to avoid a potential collision with an object around the vehicle. Of course, though described herein as a primary and secondary system, the techniques described may be implemented in any number of systems and subsystems in order to verify controls, provide high integrity algorithms, and redundant processes for safe control.

The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, determine an object track, generate a trajectory for the vehicle, and so on. In one example, the primary system generates a primary trajectory for controlling the vehicle and a secondary, contingent trajectory for controlling the vehicle, and provides the primary trajectory and the secondary trajectory to the secondary system. The contingent trajectory may control the vehicle to come to a stop and/or to perform another maneuver (e.g., lane change, etc.).

The secondary system may generally evaluate the primary system using at least a subset of data (e.g., sensor data) made available to the primary system. The secondary system may use similar techniques as used in the primary system to verify outputs of the primary system and/or use dissimilar techniques to ensure consistency and verifiability of such outputs. In examples, the secondary system may include a localizer to independently localize the vehicle by determining a position and/or orientation (together a pose) of the vehicle relative to a point and/or object in an environment where the vehicle is located. The secondary system may also include a perceiver to detect an object around the vehicle, determine a track for the object, predict a trajectory for the object, and so on. The secondary system may include a monitor component to monitor one or more components of the vehicle to detect an error with the one or more components. Further, the secondary system may include a trajectory manager to use data from the localization component, the perceiver, and/or the monitor component of the secondary system to evaluate a trajectory of the vehicle provided by the primary system and/or determine a trajectory to use to control the vehicle. The secondary system may also include a drive manager (and/or a system controller(s)) to receive a trajectory from the trajectory manager and control the vehicle based on the trajectory.

To illustrate, the trajectory manager may perform one or more operations to evaluate (or validate) a trajectory provided by the primary system. For example, the secondary system may check to see if a trajectory was generated less than a threshold amount of time ago, if the trajectory is consistent with a current or previous pose of the vehicle (e.g., the trajectory controls the vehicle to be positioned at a location that is possible given the current pose of the vehicle), if the trajectory is compatible with a capability of the vehicle (e.g., steering limits, acceleration limits, etc.), and so on. Further, the trajectory manager may check to see if a trajectory is associated with a collision. For example, the trajectory manager may check to see if a trajectory of the vehicle provided by the primary system intersects with a trajectory of an object determined by the perceiver of the secondary system and if the object and the vehicle meet at the intersection at the same time (or within a window of time) and/or within a threshold distance from one another. That is, the trajectory manager may determine if the vehicle would collide with an object if the vehicle is maintained along the trajectory provided by the primary system and/or the associated uncertainties of such an event. Such collision checking may be based on direct kinematic assumptions of travel and/or predictions of motion as determined by one or more additional techniques.

In examples, the trajectory manager may evaluate each trajectory of a vehicle that is provided by the primary system. For instance, the trajectory manager may evaluate a primary trajectory that is generated by the primary system (e.g., a highest-level trajectory) and a secondary trajectory that is generated by the primary system (e.g., a next highest-level trajectory). The secondary trajectory may be a contingent trajectory that may be used in cases where the primary trajectory is invalid (e.g., does not provide a safe trajectory for the vehicle, is incompatible with a current vehicle state, and the like). Further, in examples, the trajectory manager may generate a tertiary trajectory for the vehicle (e.g., a next highest-level trajectory) and evaluate the tertiary trajectory. The tertiary trajectory may be a further contingent trajectory that may be used in cases where the primary and secondary trajectories are invalid. The tertiary trajectory may cause the vehicle to come to a stop along the secondary trajectory (or the primary trajectory, in some cases) or to perform another maneuver (e.g., lane change, swerve, etc.). In some examples, the tertiary trajectory may be determined based at least in part on minimal modifications of the secondary trajectory (e.g., modifications to longitudinal accelerations, steering angles, lateral accelerations, and the like).

The trajectory manager may determine a trajectory to use to control the vehicle based on an evaluation of the trajectory or trajectories. For example, the trajectory manager may select a primary trajectory provided by the primary system if a state of the primary trajectory indicates that the primary trajectory is collision free or is associated with a collision in the "far" future (e.g., the primary trajectory is temporarily valid). Further, the trajectory manager may select a secondary trajectory provided by the primary system if the primary trajectory is associated with a state indicating that a collision is imminent and the secondary trajectory is associated with a state indicating that the secondary trajectory is collision free. Moreover, the trajectory manager may select a tertiary trajectory generated by the trajectory manager if the primary trajectory is associated with a state indicating that a collision is imminent and the secondary trajectory is associated with a state indicating a collision. Further, the trajectory manager may select a secondary or tertiary trajectory if an error is detected by the monitor. In any of the examples above, free of collision may refer to a probability of collision (and/or being within a threshold distance of another object during a window of time) being less than or equal to a threshold probability.

Upon selecting a trajectory, the trajectory manager may send a signal to a drive manager (and/or a system controller(s)) to cause the vehicle to be controlled based on the trajectory. In at least some examples, where no trajectory is collision free, the secondary system may cause the vehicle to perform one or more operations, such as, for example, engaging an emergency brake, pre-tensioning seatbelts, etc.

In examples, the trajectory manager may maintain control of the vehicle based on a selected trajectory until a signal is received to release control from the selected trajectory. For example, the trajectory manager may transition to a lower-level trajectory at any time, if needed, and refrain from transitioning back to a higher-level trajectory until a signal is received to release control to a higher-level trajectory. To illustrate, if the trajectory manager selects a secondary trajectory due to a primary trajectory being associated with a collision, control of the vehicle may be maintained along the secondary trajectory (or an even lower-level trajectory) until a signal is received from a teleoperations system (e.g., system associated with an operator) to release control to a higher-level trajectory. By doing so, the vehicle may avoid frequent changes between trajectories.

Further, in examples, the trajectory manager may provide a message to the primary system indicating an error with a trajectory provided by the primary system. For example, if the trajectory manager determines that a collision is estimated to occur far enough in the future that the vehicle does not need to brake immediately (e.g., more than a threshold amount of time away) if the vehicle proceeds along a primary trajectory provided by the primary system, the secondary system may send a message to the primary system to warn the primary system. This may allow the primary system to adjust the primary trajectory before the collision occurs.

In at least some examples, one or more of the computations performed by the secondary system (including the warning message, trajectory validation, perception information, tracking information, etc.) may continuously be transmitted to the primary system at one or more frequencies (which may depend on the data transmitted).

In examples, the techniques and/or systems discussed herein may enhance safety of passengers in a vehicle and/or other individuals in proximity to the vehicle. For example, a secondary system may detect an error in a trajectory provided by a primary system and/or an error with a component of a vehicle, and control the vehicle to safely decelerate, stop, and/or perform another maneuver to avoid a collision. In examples, the secondary system may operate relatively independent from the primary system, so that another form of evaluation occurs to avoid a collision. For instance, the secondary system may independently detect an object in proximity to the vehicle, monitor components of the vehicle, and/or evaluate a trajectory generated by the primary system. Further, in examples, the secondary system may be a higher integrity (e.g., more verifiable) and/or less complex system than the primary system. For instance, the secondary system may be designed to process less data, include a shorter processing pipeline than the primary system, operate according to techniques that are more easily verifiable than the techniques of the primary system, and so on.

In examples, the techniques discussed herein may implement the techniques discussed in U.S. patent application Ser. No. 16/189,726, filed Nov. 11, 2018, and entitled "Perception Collision Avoidance," and/or U.S. patent application Ser. No. 16/218,182, filed Dec. 12, 2018, and entitled "Collision Avoidance System with Trajectory Validation," the entire contents of both are incorporated herein by reference.

The methods, apparatuses, and systems described herein may be implemented in a number of ways. Example implementations are provided below with reference to the following figures. Although discussed in the context of an autonomous vehicle, in some examples, the methods, apparatuses, and systems described herein may be applied to a variety of systems. In another example, the methods, apparatuses, and systems may be utilized in an aviation or nautical context. Additionally, or alternatively, the techniques described herein may be used with real data (e.g., captured using sensor(s)), simulated data (e.g., generated by a simulator), or any combination thereof.

FIG. 1 illustrates an example environment 100 in which the techniques discussed herein may be implemented. The example environment 100 shows an autonomous vehicle 102 that includes a sensor(s) 104, a primary system 106, a secondary system 108, and a system controller(s) 110. The primary system 106 may generally implement artificial intelligence (e.g., AI techniques 112) to perform a variety of operations, and the secondary system 108 may generally implement different techniques to evaluate the primary system 106 and take over control, if needed. For example, the primary system 106 processes sensor data 114 from the sensor(s) 104 to generate a primary trajectory 116 and a secondary trajectory 118. The primary system 106 may send the primary trajectory 116 and the secondary trajectory 118 to the secondary system 108. The secondary system 108 may process sensor data 120 from the sensor(s) 104 to evaluate the primary trajectory 116 and/or the secondary trajectory 118. In examples, techniques performed by the secondary system 108 may comprise similar techniques as those employed by the primary system 106 and results may be compared to determine similarity. In other examples, the secondary system 108 may use dissimilar techniques as those in the primary system 106 such that similar results may be indicative of a correct functioning of both systems. Based on the evaluation, the secondary system 108 may select an output trajectory 122 and send the output trajectory 122 to the system controller(s) 110 to control the autonomous vehicle 102. The output trajectory 122 may include the primary trajectory 116, the secondary trajectory 118, and/or another trajectory, such as a trajectory that is generated by the secondary system 108, as discussed in detail below. In the example of FIG. 1, the primary trajectory 116 and the secondary trajectory 118 are illustrated as being sent from the primary system 106. However, in some examples, a single trajectory may be sent by the primary system 106 and/or any number of additional trajectories may be sent by additional systems not pictured.

Although many of the techniques are discussed in the context of the secondary system 108 sending a signal to the system controller(s) 110 (e.g., sending the output trajectory 122), the primary system 106 may alternatively, or additionally, send a signal to the system controller(s) 110, in some cases.

The sensor(s) 104 may include a variety of sensors, such as light detection and ranging (LIDAR) sensors, RADAR sensors, ultrasonic transducers, sonar sensors, location sensors (e.g., global navigation satellite system (GNSS) (including global positioning systems (GPS)), compass, etc.), inertial sensors (e.g., inertial measurement units (IMUs), accelerometers, magnetometers, gyroscopes, etc.), cameras (e.g., red-green-blue (RGB), infrared (IR), intensity, depth, etc.), time of flight sensors, microphones, wheel encoders, environment sensors (e.g., temperature sensors, humidity sensors, light sensors, pressure sensors, etc.), etc.

As noted above, the primary system 106 may generally process the sensor data 114 and the secondary system 108 may process the sensor data 120. In some examples, the sensor data 120 includes a subset of the sensor data 114. To illustrate, the sensor data 114 may include data from a wide variety of the sensor(s) 104, such as location data, inertial data, LIDAR data, RADAR data, image data, audio data, environmental data, depth data, etc. Meanwhile, the sensor data 120 may include data from a more limited set of the sensor(s) 104, such as LIDAR data, RADAR data, and/or time of flight data. In other examples, the sensor data 120 includes the same or more data than the sensor data 114, such as one or more of location data, inertial data, LIDAR data, RADAR data, image data, audio data, environmental data, and/or depth data. In at least some examples, the subsets of sensor data 120 used by the secondary system 108 may be based on, for example, one or more processes and may differ from one another. As a non-limiting example, whereas the primary system 106 may use all sensor(s) for localization and object detection, localization on the secondary system 108 may only use IMU and wheel odometry data and object detection on the secondary system 108 may only use LIDAR data.

The primary system 106 may control the vehicle during normal operation. In many examples, the primary system 106 may be the main computing system on the autonomous vehicle 102. The primary system 106 may implement the AI techniques 112 to understand an environment around the autonomous vehicle 102 and/or instruct the autonomous vehicle 102 to move within the environment. The AI techniques 112 may include machine learning (also referred to, generally, as machine learned models), such as one or more neural networks. For example, the primary system 106 may analyze the sensor data 114 to localize the autonomous vehicle 102, detect an object around the autonomous vehicle 102, segment the sensor data 114, determine a classification of the object, predict an object track, generate the primary trajectory 116 and/or the secondary trajectory 118 for the autonomous vehicle 102, and so on. In the example of FIG. 1, the primary system 106 generates the primary trajectory 116 to control the autonomous vehicle 102 and generates the secondary trajectory 118 as a contingent (e.g., backup) trajectory to be used instead of the primary trajectory in the event that the primary trajectory 116 is invalid or otherwise unacceptable, or otherwise to be executed in the case of hardware or software failures, or the like. In examples, the secondary trajectory 118 may control the autonomous vehicle 102 to decelerate to a stop (e.g., a gentle stop associated with a deceleration rate that is less than a maximum deceleration rate that is possible for the autonomous vehicle 102). In at least some examples, the secondary trajectory 118 may comprise complex maneuvers (including steering, accelerations, etc.) to enable the vehicle 102 to move to a side of a road, avoid obstacles, or generally increase an amount of safety for the occupants.

In examples, a trajectory comprises a control(s) for a steering angle and/or acceleration of the autonomous vehicle 102. Further, a trajectory may comprise a sequence of times and vehicle states (e.g., poses) which represent an estimated future path of the autonomous vehicle 102. For example, a trajectory may control a path that the autonomous vehicle 102 will take over a window of time (e.g., one millisecond, half a second, two seconds, ten seconds, etc.). A trajectory may be continuously updated over time to control motion of the autonomous vehicle 102.

The secondary system 108 may evaluate the primary system 106 and take over control of the autonomous vehicle 102 when there is a problem with the primary system 106. The secondary system 108 may implement secondary techniques (e.g., probabilistic techniques, techniques that are different than the AI techniques 112, etc.) that are based on position, velocity, acceleration, etc. of the autonomous vehicle 102 and/or objects around the autonomous vehicle 102. For example, the secondary system 108 may implement a Kalman filter, an extended Kalman filter (EKF), a particle filter, and/or tracking algorithms to process sensor data, segment sensor data, identify a classification of an object, predict an object trajectory, and so on. In examples, the secondary system 108 may not perform any form of AI techniques. In some examples, the AI techniques 112 may use neural networks, while the secondary system 108 may refrain from using such neural networks. In other examples, the secondary system 108 may perform AI techniques, such as implementing a machine learned model that is different (or the same in some instances) than a machine learned model implemented by the primary system 106. Although a single secondary system 108 is illustrated, in examples the secondary system 108 may be implemented as multiple systems, such as multiple hardware/software systems. In examples, the secondary system 108 may have a different range of vision than the primary system 106 (e.g., detect and/or process sensor data at a different range than the primary system 106), operate at a different rate of processing than the primary system 106 (e.g., process instructions at a faster (or slower in some cases) rate than the primary system 106), and so on.

In examples, to evaluate the primary system 106, the secondary system 108 may process the sensor data 120 to determine a position and/or orientation (together a pose) of the autonomous vehicle 102 relative to a point and/or object in an environment. Further, the secondary system 108 may process the sensor data 120 to detect objects around the autonomous vehicle 102, track the objects over time, and/or predict trajectories for the objects. In some examples, the secondary system 108 may receive information from the primary system 106 indicating tracks of objects that are detected by the primary system 106 and/or predicted trajectories of the objects. A track of an object may include a path traveled by the object (e.g., previous states—positions, orientations, velocities, etc., as well as center locations, extents, etc., and/or uncertainties associated therewith). A track of an object may represent (or be based on) a current or previous position, velocity, acceleration, orientation, and/or heading of the object over a period of time (e.g., 5 seconds). The secondary system 108 may maintain a track and/or predicted trajectory for each object detected around the autonomous vehicle 102. In the example of FIG. 1, the secondary system 108 estimates a trajectory 124 for an object 126. Here, the object 126 represents a person, although the object 126 may represent any type of object, such as another vehicle, a structure (e.g., building, etc.), an animal, a sign, and so on.

The secondary system 108 may use the pose, track, and/or predicted trajectory to evaluate the primary trajectory 116 and/or the secondary trajectory 118. The secondary system 108 may perform one or more validation operations to validate the primary trajectory 116, the secondary trajectory 118, and/or a trajectory that is generated by the secondary system 108, such as a collision avoidance trajectory (e.g., a trajectory that causes the autonomous vehicle 102 to decelerate to a stop, which may be a modified version of either the primary trajectory 116 or the secondary trajectory 118). In examples, the secondary system 108 may validate one or more of the primary trajectory 116, the secondary trajectory 118, and/or the trajectory that is generated by the secondary system 108 in parallel (e.g., the collision avoidance trajectory). Although any of such trajectories may be validated in series or another manner.

In examples, the secondary system 108 may perform the one or more validation operations to determine if a trajectory is relatively new, consistent with a state of the autonomous vehicle 102, and/or feasible with limitations of the autonomous vehicle 102. For example, the secondary system 108 may determine if a trajectory was generated less than a threshold amount of time ago (e.g., indicating that the trajectory is relatively new and should be used), if the trajectory is consistent with a current or previous pose of the vehicle (e.g., the trajectory controls the autonomous vehicle 102 to be positioned at a location that is possible given the current pose of the autonomous vehicle 102), if the trajectory is compatible with a capability of the autonomous vehicle 102 (e.g., steering limits, acceleration limits, etc.), and so on.

Further, in examples, the secondary system 108 may perform the one or more validation operations to determine if a trajectory is associated with a collision. For example, the secondary system 108 may determine if a trajectory provided by the primary system 106 intersects with a trajectory of an object determined by the secondary system 108. That is, the secondary system 108 may determine if the autonomous vehicle 102 would collide with an object if the autonomous vehicle 102 continues along the trajectory (e.g., detect a collision that was potentially missed by the primary system 106). In at least some examples, this may comprise a probability of the vehicle 102 coming within a threshold distance of the object within a window of time being below a threshold probability. In examples, the secondary system 108 may use a straight-line approximation to predict a trajectory of an object.

Based on the one or more validation operations, the secondary system 108 may determine a state for a trajectory. For example, the secondary system 108 may determine a valid state for a trajectory if the trajectory was generated less than a threshold amount of time ago, if the trajectory is consistent with a current or previous pose of the autonomous vehicle 102, if the trajectory is compatible with a capability of the autonomous vehicle 102, and/or if the trajectory is collision free or associated with a collision in more than a threshold amount of time. Further, the secondary system 108 may determine an invalid state for a trajectory if the trajectory was generated more than a threshold amount of time ago, if the trajectory is inconsistent with a current or previous pose of the autonomous vehicle 102 (e.g., to effectuate the trajectory would necessitate a large (and substantially instantaneous) change in vehicle state), if the trajectory is incompatible with a capability of the autonomous vehicle 102 (e.g., where the trajectory indicates steering angles and/or accelerations unachievable by hardware of the autonomous vehicle 102), and/or if the trajectory is associated with a collision.

In examples, the secondary system 108 may also monitor one or more components of the autonomous vehicle 102. For example, the secondary system 108 may monitor the primary system 106, the secondary system 108, and/or any other hardware/software component of the autonomous vehicle 102 (e.g., motors, controllers, etc.) to detect an error. The secondary system 108 may detect an error if there is a hardware and/or software failure for the primary system 106, the secondary system 108, and/or another component, if power to the primary system 106, the secondary system 108, and/or another component is disrupted, if a signal has not been received from the primary system 106, the secondary system 108, and/or another component for some time, etc.

The example of FIG. 1 illustrates that the secondary system 108 may determine an invalid trajectory 128 (e.g., a trajectory associated with a collision) and/or a component error 130.

The secondary system 108 may then determine the output trajectory 122 to provide to the system controller(s) 110 based on states of trajectories and/or an error with a component. For example, the secondary system 108 may generally seek to select, as the output trajectory 122, the primary trajectory 116 when the primary trajectory 116 is valid (e.g., the primary trajectory 116 is associated with a highest level). If the primary trajectory 116 is invalid, the secondary system 108 may select, as the output trajectory 122, the secondary trajectory 118 (e.g., the secondary trajectory 118 is associated with a next highest level). If the primary trajectory 116 and the secondary trajectory 118 are both invalid, the secondary system 108 may select, as the output trajectory 122, a trajectory that is generated by the secondary system 108, such as a collision avoidance trajectory that causes the autonomous vehicle 102 to come to a stop along a modified version of the primary trajectory 116 or the secondary trajectory 118 (e.g., to avoid a potential collision). For example, the secondary system 108 may use steering controls associated the primary trajectory 116 or the secondary trajectory 118 while modifying acceleration parameters associated with the primary trajectory 116 or the secondary trajectory 118 to cause the autonomous vehicle 102 to stop. Further, if an error is detected with the primary system 106, the secondary system 108, and/or any other hardware/software component of the autonomous vehicle 102, the secondary system 108 may select, as the output trajectory 122, the secondary trajectory 118 and/or a trajectory that is generated by the secondary system 108.

In some examples, if the secondary system 108 is unable to select or generate a trajectory that avoids a collision, the secondary system 108 (or another component, such as a drive manager) may generate a maximum deceleration trajectory that causes the autonomous vehicle 102 to come to a stop at a maximum deceleration rate that is available for the autonomous vehicle 102 (e.g., from among multiple deceleration rates that are available). This may help mitigate damage for a potential collision.

In examples, the secondary system 108 may maintain control of the autonomous vehicle 102 based on the output trajectory 122 until a signal is received to release control from the output trajectory 122. For example, the secondary system 108 may transition to a lower-level trajectory at any time, if needed, and refrain from transitioning back to a higher-level trajectory until a signal is received to release control to a higher-level trajectory. To illustrate, if the secondary system 108 selects the secondary trajectory 118 due to the primary trajectory 116 being invalid, control of the autonomous vehicle 102 may be maintained along the secondary trajectory 118 (or an even lower-level trajectory) until a signal is received from a teleoperations system (e.g., system associated with an operator) to release control to a higher-level trajectory. By doing so, the autonomous vehicle 102 may avoid frequent changes between trajectories.

Further, in examples, the secondary system 108 may provide a message 132 to the primary system 106 about an error with a trajectory provided by the primary system. For example, if the secondary system 108 determines that a collision is estimated to occur for the primary trajectory 116 far enough in the future that the autonomous vehicle 102 does not need to brake immediately (e.g., more than a threshold amount of time away), the secondary system 108 may send the message 132 to the primary system 106 to warn the primary system 106. The message 132 may indicate that the primary trajectory 116 is associated with a collision and/or that control of the autonomous vehicle 102 will be taken over by the secondary system 108 if the autonomous vehicle 102 is maintained based on the primary trajectory 116. This may allow the primary system 106 to adjust the primary trajectory 116 before the collision occurs. Though depicted in FIG. 1 for illustrative purposes as being transmitted when an error is detected, the disclosure is not intended to be so limiting. For example, the secondary system 108 may continuously send output from one or more processes (perception, localization, collision/validity determinations, etc.) to the primary system 106 at one or more frequencies which may, in some examples, be dependent on the information sent.

The system controller(s) 110 may control steering, propulsion, braking, safety, emitters, communication, and/or other systems of the autonomous vehicle 102. The system controller(s) 110 may communicate with and/or control corresponding systems of a drive system(s) and/or other components of the autonomous vehicle 102. In some instances, the system controller(s) 110 may translate a trajectory selected into instructions useable by a drive system(s) to cause the autonomous vehicle 102 to traverse the trajectory.

Figure 2:
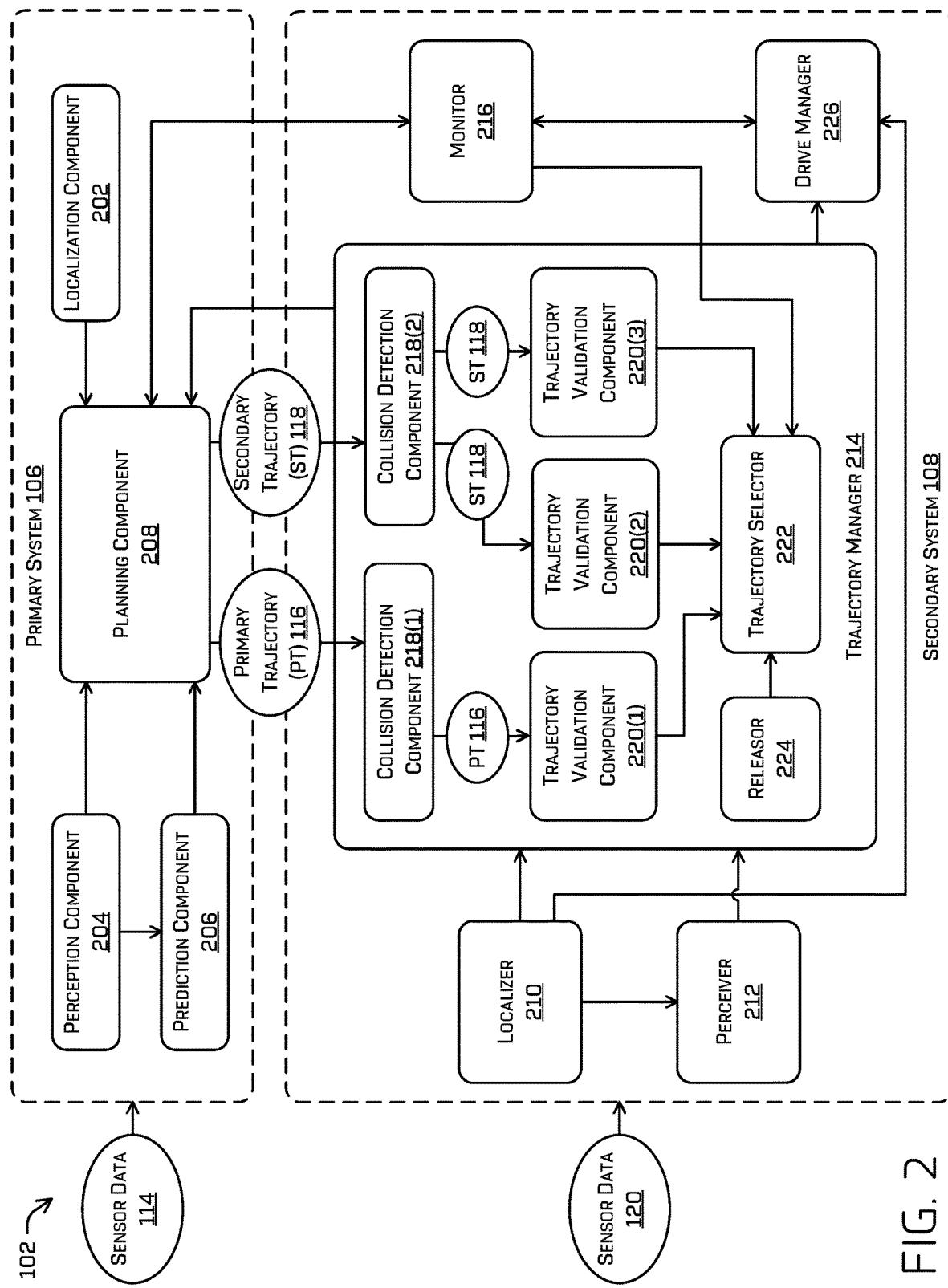
FIG. 2 depicts example details of a primary system and a secondary system of a vehicle.

FIG. 2 depicts example details of the primary system 106 and the secondary system 108 of the autonomous vehicle 102 of FIG. 1.

In this example, the primary system 106 includes at least a localization component 202 (sometimes referred to as the localizer 202), a perception component 204 (sometimes referred to as the perceiver 204), a prediction component 206 (sometimes referred to as the predictor 206), and a planning component 208 (sometimes referred to as the planner 208). The localization component 202, the perception component 204, the prediction component 206, and/or the planning component 208 may collectively and/or individually include a processing pipeline that implements one or more machine learned models, such as neural networks, that accomplish a variety of functions. Each processing pipeline may receive data and provide an output. In one example, the perception component 204 implements one or more neural networks in a processing pipeline to perform object detection, segmentation, and/or classification, in addition to (or alternative to) determining predicted motion of the such detected objects. Each stage in the pipeline may provide some aspect of perception (e.g., object detection, classification, bounding box generation, and the like) that may feed into another stage of the pipeline (e.g., provide output from one machine learned model as input into another machine learned model). In examples, the primary system 106 implements multiple neural networks that are trained using thousands or hundreds of thousands of hours of vehicle training data (which may include synthetic or simulated data). Further, the multiple neural networks may be configured to perceive a myriad of complex scenarios and control the autonomous vehicle 102 in view of those scenarios. Generally, in any example, the primary system 106 and the secondary system 108 may rely on similar and/or dissimilar hardware. In examples, the primary system 106 uses parallel computing (e.g., in a GPU), while the secondary system 108 does not. In other examples, parallel computing is used in the primary system 106 and/or the secondary system 108.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The localization component 202 may include functionality to receive the sensor data 114 from one or more of the sensor(s) 104 (not illustrated in FIG. 2) to determine a pose (e.g., position and/or orientation) of the autonomous vehicle 102 relative to a map of an environment surrounding the autonomous vehicle 102. For example, the localization component 202 may determine and/or receive a map of an environment and may continuously determine a location of the autonomous vehicle 102 within the map. The map may comprise a topological map, an occupancy grid, a point map, a landmark map, a mesh, a graph of pose constraints, and/or any other suitable map. In some instances, the localization component 202 may utilize SLAM (simultaneous localization and mapping) or CLAMS (calibration, localization and mapping, simultaneously) to receive image data, LIDAR data, RADAR data, IMU data, GPS data, wheel encoder data, and/or the like to accurately determine a location/pose of the autonomous vehicle 102. The location of the autonomous vehicle 102 may comprise a pose that includes a relative position and/or orientation of the autonomous vehicle 102 in relation to point(s) and/or object(s) in the map, a local coordinate, and/or a global coordinate (e.g., a GPS coordinate). In additional or alternate instances, the orientation may include an indication of a yaw, roll, and/or pitch of the autonomous vehicle 102 relative to a reference plane and/or relative to point(s) and/or object(s) in the map. Together the position and/or orientation may describe a "pose."

In some instances, the localization component 202 may provide data to various components of the autonomous vehicle 102. For example, the localization component 202 may provide a pose of the autonomous vehicle 102 to the planning component 208 to generate a trajectory, as discussed below. In other examples, the localization component 202 may provide a pose of the autonomous vehicle 102 to other components of the autonomous vehicle 102, such as the perception component 204 and/or the prediction component 206.

The perception component 204 may include functionality to perform object detection, segmentation, and/or classification. In some examples, the perception component 204 may receive as input the sensor data 114 and output primary perception data that indicates a presence of an object that is proximate to the autonomous vehicle 102 and/or a classification of the object as an object type (e.g., a semantic label such as, for example, car, pedestrian, cyclist, animal, building, tree, road surface, curb, sidewalk, unknown, etc.). Additionally, or alternatively, the perception component 204 may provide processed sensor data that indicates one or more characteristics associated with a detected object and/or the environment in which the object is positioned. In some examples, characteristics associated with an object may include, but are not limited to, an x-position (e.g., global position, relative position, etc.), a y-position (e.g., global position, relative position, etc.), a z-position (e.g., global position, relative position, etc.), an orientation, an object type (e.g., a classification), a velocity of the object, an extent of the object (size), etc. and/or associated uncertainties. In some examples, a velocity of an object may be determined from multiple detections of the same object in subsequent data, RADAR processing and/or other techniques. Characteristics associated with the environment may include, but are not limited to, a presence of another object in the environment, a state of another object in the environment, a time of day, a day of a week, a season, a weather condition, an indication of darkness/light, etc.

In some instances, the perception component 204 may provide primary perception data and/or processed sensor data to various components of the autonomous vehicle 102. For example, the perception component 204 may provide primary perception data and/or processed sensor data to the planning component 208 and/or the prediction component 206. In other examples, the perception component 204 may provide primary perception data and/or processed sensor data to other components of the autonomous vehicle 102, such as the localization component 202. In examples, primary perception data and/or processed sensor data may be in the form of a primary object list including a list of objects and/or characteristics for each of the objects.

The prediction component 206 may associate a track with a detected object and/or predict an object trajectory. A track of an object may comprise historical object position, velocity, acceleration, and/or orientation. In some instances, the prediction component 206 may determine whether or not to associate a historical object track with an object recently detected by the perception component 204. For example, the prediction component 206 may determine whether a recently detected object has similar features with respect to the object as previously detected (e.g., similar feature map, proximate embeddings, similar visual features (FAST, BRISK, ORB, etc.), and the like), is within a threshold distance of a previous position of the object associated with the historical track, a threshold velocity of a previous velocity of the object associated with the historical track, etc. In some examples, the prediction component 206 may include machine learned models to predict a behavior of an object in the environment based on lighting state (e.g., blinker detection), object velocity/acceleration, map data (e.g., lane information indicating reasonable driving behaviors), and/or learned object behaviors. In some examples, the prediction component 206 may predict one or more predicted object trajectories for a specific object detected by the perception component 204 based on, for example, probabilistic determinations or multi-modal distributions of a historical, current, and/or or predicted position, velocity, acceleration, and/or orientation of an object.

In some instances, the prediction component 206 may provide data regarding an object track, predicted object trajectories (e.g., one or more trajectories and associated uncertainties), and/or other data to various components of the autonomous vehicle 102. For example, the prediction component 206 may provide such data to the planning component 208. In some examples, the prediction component 206 may generate a heat map associated with predicted motion of an object and may provide such a heat map to the planning component 208. In other examples, the prediction component 206 may provide data regarding an object to other components of the autonomous vehicle 102, such as the localization component 202 and/or the perception component 204. Further, in some examples, data regarding an object may be provided to the secondary system 108. In examples, data regarding an object may be stored in a primary object list.

In some examples, the perception component 204 and/or the prediction component 206 may implement techniques discussed in U.S. patent application Ser. No. 15/897,028 entitled "Detecting Blocking Objects" and filed Feb. 14, 2018, and U.S. patent application Ser. No. 15/947,486 entitled "Feature-Based Prediction" and filed Apr. 6, 2018, the entire contents of all of which are incorporated herein by reference.

The planning component 208 may determine a path and/or trajectory for the autonomous vehicle 102 to follow to traverse through an environment. For example, the planning component 208 may determine various routes and/or trajectories and various levels of detail. For example, the planning component 208 may determine a route to travel from a first location (e.g., a current location) to a second location (e.g., a target location). In examples, a route may be a sequence of waypoints for travelling between two locations. As non-limiting examples, waypoints include streets, intersections, global positioning system (GPS) coordinates, etc. Further, the planning component 208 may generate an instruction for guiding the autonomous vehicle 102 along at least a portion of the route from the first location to the second location. In at least one example, the planning component 208 may determine how to guide the autonomous vehicle 102 from a first waypoint in the sequence of waypoints to a second waypoint in the sequence of waypoints. In some examples, the instruction may comprise a trajectory, or a portion of a trajectory.

In examples, the planning component 208 may generate the primary trajectory 116 and/or send the primary trajectory 116 to the secondary system 108. For example, the planning component 208 may substantially simultaneously (e.g., within technical tolerances) generate multiple trajectories in accordance with a receding horizon technique and/or based at least in part on data received from the other components of the primary system 106. In some instances, the planning component 208 may conduct a cost-based search (or any other suitable algorithm for identifying a suitable trajectory for controlling motion of the autonomous vehicle 102) over the multiple trajectories to identify the primary trajectory 116 to transmit to the secondary system 108.

In examples, the planning component 208 may generate the secondary trajectory 118 and/or send the secondary trajectory 118 to the secondary system 108. For example, the planning component 208 may generate multiple contingent trajectories and select one of the contingent trajectories to be the secondary trajectory 118. The secondary trajectory 118 may represent a backup trajectory that is used in the event that the primary trajectory 116 is invalid or otherwise unacceptable. The secondary trajectory 118 may differ from the primary trajectory 116. In one example, the primary trajectory 116 may cause the autonomous vehicle 102 to accelerate or maintain a particular velocity, while the secondary trajectory 118 may cause the autonomous vehicle 102 to decelerate to a stop, such as a gentle stop (as discussed below). In another example, the primary trajectory 116 may cause the autonomous vehicle 102 to make a lane change, whereas the secondary trajectory 118 may cause the autonomous vehicle 102 to stay in a same lane. In yet another example, the primary trajectory 116 may cause the autonomous vehicle 102 to maintain a current speed and steering angle, whereas the secondary trajectory 118 may cause the autonomous vehicle 102 to pull over onto a roadway shoulder. In any example, both the primary trajectory 116 and secondary trajectory 118 may comprise a set of vehicle states (positions, orientations, velocities, etc.) and/or commands (accelerations, steering angles, etc.) to be attained by the autonomous vehicle 102 at future points along the trajectory and/or future times along the trajectory.

In examples, a gentle stop may include braking at a particular rate, such as a predetermined rate, a rate that is less than a first rate (e.g., maximum braking rate), a rate that is greater than a second rate (e.g., minimum braking rate), a rate from among a plurality of available rates that is substantially in the middle (e.g., a third rate from among five rates), a minimum rate from among a plurality of rates, and so on. A rate of deceleration may refer to a unit of measurement over time, such as a number of meters or feet per second squared ($m/s^2$). In one example, a gentle stop may include decelerating at a rate of 5 or 10 feet per second squared until the autonomous vehicle 102 comes to a stop.

Although the localization component 202, the perception component 204, and the prediction component 206 are discussed in many examples as providing outputs to each other (or other components of the primary system 106), any of these components may provide output to the secondary system 108, in some examples. As a non-limiting example, the primary system 106 may provide object track information to the secondary system 108.

As illustrated, the secondary system 108 includes a localizer 210, a perceiver 212 (sometimes referred to as the perception/prediction component 212), a trajectory manager 214, and a monitor 216. In examples, the localizer 210, the perceiver 212, the trajectory manager 214, and/or the monitor 216 may implement a model that is based on positioning, velocity, acceleration, etc. of the autonomous vehicle 102 and/or objects around the vehicle. In some examples, such models may incorporate probabilistic models. For example, the secondary system 108 may implement a Kalman filter (also referred to as linear quadratic estimation (LQE)) (e.g., an extended Kalman filter (EKF), an unscented Kalman filter (UKF), etc.), a particle filter, a Bayesian filter, and so on. To illustrate, the perceiver 212 may implement a Kalman filter or particle filter in order to associate sensor data with previous data for detection, tracking, prediction, etc. In some examples, the secondary system 108, in contrast to the primary system 106, may be configured in such a way to exclude the use of machine learned models or to reduce the number of machine learned models. In other examples, the secondary system 108 may include one or more machine learned models different than (or similar or identical) those of the primary system 106 (e.g., having different internal network architectures, yet yielding similar outputs based on similar inputs). In some examples, the secondary system 108 may use different hardware (e.g., processors and memory) than the primary system 106.

In examples, the secondary system 108 may be designed to be less computationally burdensome and/or operate at a higher integrity level. For example, a processing pipeline of the secondary system 108 may be simpler by relying on less sensor data, include less complex pipeline components, include less pipeline components overall, output less data, and/or exclude and/or limit the use of machine learned models. In some instances, the secondary system 108 may be a "high-integrity" system by achieving stringent operating tolerances and/or have the ability to be inspected (verified). In examples, the secondary system 108 may have a higher level of reliability and/or verifiability than the primary system 106. For example, output of a sub-component of the secondary system 108 may be certified to operate with complete accuracy or near-complete accuracy (e.g., 99.99% of scenarios, or higher). In some examples, the secondary system 108 may comprise an Automotive Safety Integrity Level (ASIL) D certification.

The localizer 210 may process the sensor data 120 from the sensor(s) 104 to determine one or more of a position and/or orientation (together a pose) of the autonomous vehicle 102. Here, the position and/or orientation may be relative to point(s) and/or object(s) in an environment in which the autonomous vehicle 102 is located. In examples, the orientation may include an indication of a yaw, roll, and/or pitch of the autonomous vehicle 102 relative to a reference plane and/or relative to point(s) and/or object(s). In examples, the localizer 210 may perform less processing than the localization component 202 of the primary system 106 (e.g., higher-level localization). For instance, the localizer 210 may not determine a pose of the autonomous vehicle 102 relative to a map, but merely determine a pose of the autonomous vehicle 102 relative to objects and/or surfaces that are detected around the autonomous vehicle 102 (e.g., a local position and not a global position) and/or to a previous pose of the autonomous vehicle 102. Such a position and/or orientation may be determined, for example, using probabilistic filtering techniques, such as, for example, Bayesian filters (Kalman filters, extended Kalman filters, unscented Kalman filters, etc.) using some or all of the sensor data 120.

The localizer 210 may provide the position and/or orientation of the autonomous vehicle 102 to various components of the secondary system 108, such as the perceiver 212, the trajectory manager 214, the drive manager 226, etc.

In some examples, the localizer 210 may include a pose validator to validate a pose of the autonomous vehicle 102. For example, the pose validator may check that the pose is consistent with a previous pose of the autonomous vehicle 102. The pose may be valid if the pose does not change by more than a threshold amount from a previous pose (e.g., with respect to lateral movement, vertical movement, orientation, etc.). In examples, the pose validator may provide data about whether or not the pose is valid to various components of the secondary system 108, such as the perceiver 212, the trajectory manager 214, the drive manager 226, etc.

The perceiver 212 may include functionality to perform object detection, object segmentation, object classification, track determination, and/or predicting one or more trajectories for each object (including uncertainties, for example), etc. In some examples, the perceiver 212 may receive, as input data, the sensor data 120 from one or more of the sensor(s) 104, a pose of the autonomous vehicle 102 from the localizer 210, data indicating a direction of motion of the autonomous vehicle 102, data indicating a velocity of the autonomous vehicle 102, data indicating an acceleration of the autonomous vehicle 102, data indicating a yaw rate of the autonomous vehicle 102, data indicating a yaw acceleration, and/or data indicating a steering angle and/or steering angle rate of the autonomous vehicle 102. Further, in some examples, the perceiver 212 may receive, as input data, data from the primary system 106, such as a primary object list from the perception component 204, a pose of the autonomous vehicle 102, one or more object tracks as determined by the primary system 106, etc. As noted above, the object list from the primary system 106 may include primary perception data, processed sensor data, data regarding a track/trajectory of an object, etc. In such an example, the perceiver 212 may perform data association (e.g., by using probabilistic filters, clustering, nearest point analysis, or the like) to associate sensor data with a track.

The perceiver 212 may process the input data to determine secondary perception data. The secondary perception data may indicate a presence of an object that is proximate to the autonomous vehicle 102, a characteristic(s) associated with the object, and so on. Here, a characteristic(s) associated with an object may include a position of the object relative to the autonomous vehicle 102, an orientation of the object relative to the autonomous vehicle 102, a velocity of the object, an acceleration of the object, an extent of the object (a size of the object), etc. In many examples, a characteristic included in the secondary perception data does not include a classification of an object (e.g., semantic label). Although in some examples, the secondary perception data may indicate a classification.

The perceiver 212 may also process the input data to determine one or more tracks for an object. As noted above, a track of an object may comprise historical position, velocity, acceleration, and/or orientation, extents, and the like and/or uncertainties associated therewith. In one example, the perceiver 212 may implement a Kalman filter for data association and/or use of features in the data (e.g., unique/salient points of data, such as unique pixels) to associate a new detection with a previously detected object. In another example, the perceiver 212 may determine an object in an environment at a first time, determine an object in an environment at a second time, determine an overlap of the objects at the first time and second time, and generate a track for the object. In yet another example, the perceiver 212 may determine a velocity of an object at a first time, compare a predicted motion of the object with captured data of the object at a second time, determine an overlap, and generate a track for the object. The perceiver 212 may determine a track for each object detected around the autonomous vehicle 102. In some examples, the perceiver 212 may determine a track of an object independently from data received from the primary system 106 (e.g., will not use a primary object list and/or a pose of the autonomous vehicle 102 received from the primary system 106). While in other examples, the perceiver 212 may use data received from the primary system 106.

The perceiver 212 may also process the input data to determine one or more predicted trajectories for an object. For example, based on a current position of an object and a velocity of the object over a period of a few seconds, the perceiver 212 may predict a path that the object will move over the next few seconds. In some examples, such a predicted path may comprise using linear assumptions of motion given a position, orientation, velocity, and/or orientation, such as using a straight-line approximation and/or fit to higher order models. In other examples, such predicted paths may comprise more complex analyses, such as using an extended Kalman filter (EKF) propagation, models of object behavior, or other prediction techniques.

The perceiver 212 may output the secondary perception data and/or data regarding an object (e.g., a track, trajectory, etc.) to the trajectory manager 214 and/or any other component of the secondary system 108. In examples, the secondary perception data and/or data of an object are represented in a secondary object list. For instance, the object list may indicate, for each object, a characteristic(s) of the object and/or a track/trajectory of the object. In examples, the perceiver 212 may output the secondary perception data and/or data regarding an object to the primary system 106.

For ease of illustration the perceiver 212 (and other components of the primary system 106 and the secondary system 108) is illustrated with a single block. However, the perceiver 212 (and/or other components of the primary system 106 and the secondary system 108) may be implemented as any number of blocks, each block located in one or more system or subsystem.

The trajectory manager 214 may evaluate the primary system 106 and take over control of the autonomous vehicle 102 if a problem is detected. For example, the trajectory manager 214 may evaluate the primary trajectory 116 and/or the secondary trajectory 118 to determine if the primary trajectory 116 and/or the secondary trajectory 118 should be used, or another trajectory should be used. As illustrated, the trajectory manager 214 may include collision detection components 218(1)-(2) (sometimes referred to as the collision detectors 218), trajectory validation components 220(1)-(3) (sometimes referred to as the trajectory validators 220), a trajectory selector 222, and a releasor 224.

The collision detection component 218 may evaluate the primary trajectory 116 and the secondary trajectory 118 to detect a potential collision. For example, the collision detection component 218(1) may determine if the primary trajectory 116 intersects with (or comes within a threshold distance of) a predicted trajectory of an object (e.g., determined by the perceiver 212) and if the object and the autonomous vehicle 102 would meet at the intersection at the same time (or a window of time) and/or a probability associated therewith is less than or equal to a threshold. These determinations may be repeated for any number of objects detected. In at least some examples, determinations may be made in the order of objects from nearest to the autonomous vehicle 102. In some examples, such determinations regarding all objects may be performed substantially simultaneously. Further, such determinations may additionally or alternatively include information regarding uncertainties of one or more of the trajectory of the autonomous vehicle 102 as well as those of the objects. The collision detection component 218(2) may determine if the secondary trajectory 118 intersects with a predicted trajectory of an object(s) (e.g., determined by the perceiver 212) (and/or meets or exceeds a threshold certainty of collision) and if the object and the autonomous vehicle 102 would meet at the intersection at the same time (or a window of time) and/or within a threshold distance from one another.

The collision detection components 218 may detect if a trajectory for the autonomous vehicle 102 intersects at a present time or a future time for any number of objects detected by the autonomous vehicle 102. In some instances, this may include determining if a predicted object trajectory and a vehicle trajectory intersect and/or come within a threshold distance of each other (e.g., a location of proximity), determining if an object along the predicted object trajectory and the autonomous vehicle 102 along the vehicle trajectory would meet at any intersection or location of proximity at the same time or a window of time and/or within a threshold distance of one another, and/or determining if a bounding box for the object overlaps with a bounding box for the autonomous vehicle 102 around any intersection or location of proximity and/or within a threshold distance from one another. Further, in examples, the same process may be performed with a safety margin around each bounding box (e.g., a safety bounding box that represents a bounding box that has been enlarged by a particular amount, such as by adjusting a length/width/height of a bounding box). A bounding box may represent a spatial location, orientation, and/or size (e.g., extents) of an object. For example, a bounding box may be a representation of an object defined by eight corners (e.g., a cuboid) and having a position, orientation, length, width, and/or height. In examples, a bounding box may be a minimum volume cuboid which encompasses an object.

The collision detection components 218 may provide data to the trajectory validation components 220 indicating a detection(s) of a collision. Further, as illustrated, the collision detection component 218(1) may pass the primary trajectory 116 (shown as "PT 116") to the trajectory validation component 220(1). The collision detection component 218(2) may pass the secondary trajectory 118 (shown as "ST 118") to the trajectory validation component 220(2) and the trajectory validation component 220(3).

Although two collision detection components 218 are illustrated in FIG. 2, any number of collision detection components 218 may be implemented, such as a single collision detection component 218, more than two collision detection components 218 (e.g., for further primary/secondary trajectories), and so on.

In examples, the trajectory validation components 220 may perform one or more validation operations to determine if a trajectory is valid. In some examples, the trajectory validation component 220(1) may determine if the primary trajectory 116 is valid by performing one or more validation operations discussed below in reference to FIG. 3. Further, in some examples, the trajectory validation component 220(2) may determine if the secondary trajectory 118 is valid by performing one or more validation operations discussed below in reference to FIG. 4.

Moreover, in some examples, the trajectory validation component 220(3) may determine if the secondary trajectory 118 is valid. If the secondary trajectory 118 is invalid, the trajectory validation component 220(3) may generate another trajectory and determine if the other trajectory is valid. The trajectory generated by the trajectory validation component 220(3) may include a collision avoidance trajectory that causes the autonomous vehicle 102 to decelerate to a stop in an attempt to avoid or mitigate a potential collision. For example, the collision avoidance trajectory may include a deceleration along the secondary trajectory 118 (or the primary trajectory 116, in some cases). By changing an acceleration profile along the second trajectory 118 (e.g., decelerating faster, accelerating in some parts, etc.), similar maneuvers can be made to avoid potential other objects, while coming to a stop before an anticipated collision. In some examples, the collision avoidance trajectory may comprise a perturbation of the secondary trajectory 118 (e.g., changes in any one or more of the desired vehicle states and/or associated controls) in order to mitigate any potential collisions detected in the secondary trajectory 118. The trajectory validation component 220(3) may generate the collision avoidance trajectory based on information about the pose of the autonomous vehicle 102 (e.g., provided by the localizer 210), information about an object(s) (e.g., track or trajectory information provided by the perceiver 212), information provided by the primary system 106, and/or any other information available to the secondary system 108. In some examples, the trajectory validation component 220(3) may perform one or more of the validation operations discussed below in reference to FIG. 5.

The trajectory validation components 220 may output data to the trajectory selector 222 indicating a validity of a trajectory. For example, the trajectory validation component 220(1) may determine a state of the primary trajectory 116 indicating if the primary trajectory 116 is valid or invalid and output the state to the trajectory selector 222. Further, the trajectory validation component 220(2) may determine a state of the secondary trajectory 118 indicating if the secondary trajectory 118 is valid or invalid and output the state to the trajectory selector 222. Moreover, the trajectory validation component 220(3) may determine a state of a collision avoidance trajectory (e.g., a modified secondary trajectory 118 or the secondary trajectory 118) and output the state to the trajectory selector 222.

Although three trajectory validation components 220 are illustrated in FIG. 2, any number of trajectory validation components 220 may be implemented, such as a single trajectory validation component 220, more than three trajectory validation components 220 (e.g., for further trajectories), and so on. Further, in some instances, collision detection component 218(2) and/or trajectory validation components 220(2)-(3) may not process data if one or more of the primary trajectory 116 or secondary trajectory 118 are valid. As a non-limiting example, to save computational resources, if the trajectory validation component 220(1) determines that the primary trajectory 116 is valid (and no other errors of either system exist), no other validation processes may be performed.

In examples, the trajectory manager 214 may provide a message to the planning component 208 (or another component of the primary system 106) indicating a state of a trajectory (e.g., valid or invalid). For example, one or more of the trajectory validation components 220 may send a message to the planning component 208 indicating if a trajectory is valid or invalid. In examples, the message may indicate one or more of a time to collision, extents of an object associated with a potential collision, a velocity of the object, a location of the object, or a point of collision (e.g., location of the detected collision).

The trajectory selector 222 may determine an output trajectory to send to the system controller(s) 110. The trajectory selector 222 may generally select the primary trajectory 116, the secondary trajectory 118, a collision avoidance trajectory (or another trajectory generated by the secondary system 108), and/or a maximum deceleration trajectory. Such selection may be based on one or more states for one or more trajectories provided by the trajectory validation components 220. The primary trajectory 116 may have a higher level than the secondary trajectory 118, the secondary trajectory 118 may have a higher level than the collision avoidance trajectory, and the collision avoidance trajectory may have a higher level than the maximum deceleration trajectory. In many examples, a trajectory of a lower level may be associated with a higher deceleration rate than a trajectory of a higher level. For example, the collision avoidance trajectory may be associated with a higher deceleration rate (e.g., more feet per second) than the secondary trajectory 118. The trajectory selector 222 may generally select a highest-level trajectory that is valid. This may allow the autonomous vehicle 102 to decelerate with the least amount of deceleration to avoid a collision and provide a relatively comfortable ride for passengers.

In examples, a maximum deceleration trajectory (also referred to as a hard stop or emergency stop) may include braking at a particular rate, such as a predetermined rate, a rate that is greater than a threshold (e.g., a maximum braking rate), a rate from among a plurality of available rates that is a greatest rate, and so on. In one example, a maximum deceleration trajectory may include decelerating at a rate of 15 or 20 feet per second per second until the autonomous vehicle 102 comes to a stop.

In examples, the trajectory selector 222 may select, as the output trajectory, the primary trajectory 116 when the primary trajectory 116 is valid. If the primary trajectory 116 is invalid, the trajectory selector 222 may select, as the output trajectory, the secondary trajectory 118. If the primary trajectory 116 and the secondary trajectory 118 are both invalid, the trajectory selector 222 may select, as the output trajectory, the collision avoidance trajectory. If the primary trajectory 116, the secondary trajectory 118, and the collision avoidance trajectory are all invalid, the trajectory selector 222 may select the maximum deceleration trajectory. Once the trajectory selector 222 selects a trajectory, the trajectory selector 222 may send a signal to a drive manager 226 (or the system controller(s) 110 of FIG. 1) indicating the trajectory to use to control the autonomous vehicle 102.

In examples, if the output trajectory is associated with a deceleration, the trajectory selector 222 may send a signal to another component of the autonomous vehicle 102 to prepare for such deceleration. For example, if the maximum deceleration trajectory is selected due to a likely collision, the trajectory selector 222 may output a signal to warn other components, so that the other components may prepare for a collision (e.g., pre-tensioning seat belts, preparing air bags for deployment, etc.).

In examples, the trajectory selector 222 maintains data indicating a selected trajectory (e.g., the output trajectory). For example, the trajectory selector 222 may maintain a state machine that transitions between states associated with trajectories, respectively. Example states that may be implemented by the trajectory selector 222 are discussed below in reference to FIG. 6. In examples, the trajectory selector 222 may transition to a lower-level state and may not transition to a higher-level state until a signal is received to release control from the lower-level state. In some examples, the trajectory selector 222 may maintain control based on the same lower-level trajectory (e.g., disregard updated trajectories of the same level). In other examples, a new lower-level trajectory (e.g., a secondary trajectory) may be received from the primary system 106 and the new lower-level trajectory may be used to maintain a lower-level state (e.g., accept updated trajectories of the same level).

The releasor 224 may send a signal to the trajectory selector 222 to release control from a current state (e.g., release control from a trajectory). In one example, a remote system may provide a signal to the secondary system 108 to release control from a current state, and in response, the releasor 224 may send a signal to the trajectory selector 222 to release control from the current state. The remote system may comprise an automated system, a teleoperations system associated with an operator (e.g., user), and/or another entity. The operator may help manage the autonomous vehicle 102 when a problem arises, such as an interruption in travel of the autonomous vehicle 102 (e.g., an unexpected stop). In one illustration, upon transitioning to a state associated with a trajectory other than the primary trajectory 116, the operator may communicate with passengers in the autonomous vehicle 102, analyze data associated with the autonomous vehicle 102, etc. to determine if the autonomous vehicle 102 is clear to resume normal operation (or to transition to a different state). Here, the operator may cause a signal to be sent to the secondary system 108 to release control from the current state when the operator determines that the autonomous vehicle 102 is clear to resume normal operation (or to transition to a different state). In another example, a component of the autonomous vehicle 102 may perform processing to determine that the autonomous vehicle 102 is clear to resume normal operation (or to transition to a different state) and send a signal to the releasor 224 to release control from a current state.

The monitor 216 may monitor the primary system 106, the secondary system 108, and/or other components of the autonomous vehicle 102 to determine if there is an error. In many examples, the monitor 216 may monitor the primary system 106 more globally than the trajectory manager 214 (e.g., monitor global vehicle state information instead of just trajectories). In examples, the monitor 216 may determine that an error has occurred if there is a hardware and/or software failure for the primary system 106, the secondary system 108, and/or another component (e.g., a failure of the sensor(s) 104, an actuator, or any other component of the autonomous vehicle 102), if power to the primary system 106, the secondary system 108, and/or another component is disrupted, if a signal has not been received from the primary system 106, the secondary system 108, and/or another component for some time (e.g., longer than a period of time, indicating that the primary system 106 is experiencing a problem), etc. Such determinations may be based on a signal from the primary system 106, a signal from a component of the primary system 106/secondary system 108, a signal from the drive manager 226 (or an actuator (brakes, steering, etc.), which may be in communication with the drive manager 226), and/or a signal from a service provider (e.g., remote device) indicating a hardware or software failure (e.g., diagnostics information). Additionally, or alternatively, such determinations may be based on a signal from a battery of the autonomous vehicle 102 or other component associated with providing power indicating whether or not power is being provided to the primary system 106/secondary system 108 (or a component of the primary system 106/secondary system 108). As illustrated in FIG. 2, the monitor 216 may receive a signal from the drive manager 226. Such signal may indicate an error with the drive manager 226 and/or components in communication with the drive manager 226, such as actuators. Further, the monitor 216 may communicate with the planning component 208 to receive a signal indicating an error with the planning component 208 and/or to send information about monitoring (e.g., a state of the autonomous vehicle 102 indicating an error has occurred).

If the monitor 216 determines an error with the primary system 106, the monitor 216 may send a signal to the trajectory manager 214 (the trajectory selector 222, for example) and/or the drive manager 226 indicating such error. In one examples, if the autonomous vehicle 102 is not already being controlled by a trajectory associated with a deceleration (e.g., the secondary trajectory 118, a collision avoidance trajectory, or a maximum deceleration trajectory), the trajectory selector 222 may select a trajectory associated with a deceleration and send a signal to the system controller(s) 110 to control the autonomous vehicle 102 (e.g., to come to a stop). In another example, where the signal is sent to the drive manager 226, the drive manager 226 may control the autonomous vehicle 102 to implement a maximum deceleration trajectory or another trajectory.

The drive manager 226 may receive a trajectory (e.g., from the trajectory selector 222) and/or generate commands/instructions to control the autonomous vehicle 102. For example, the drive manager 226 may control steering, propulsion, braking, safety, emitters, communication, and/or other systems of the autonomous vehicle 102. In some instances, the drive manager 226 may translate a trajectory selected into instructions useable by a drive system(s) to cause the autonomous vehicle 102 to traverse the trajectory. In examples, the drive manager 226 is implemented instead of or in cooperation the system controller(s) 110. Further, in examples, the drive manager 226 may be replaced with the system controller(s) 110. In examples, the drive manager 226 receives pose information from the localizer 210. Further, the drive manager 226 may provide data to the monitor 216, such as actuator diagnostics data indicating an error with an actuator. In examples, the drive manager 226 may maintain/store one or more previous trajectories and/or a current trajectory being used.

In some examples, the secondary system 108 or another system performs ground removal techniques on the sensor data 120. This may occur before the sensor data 120 is used by components of the secondary system 108. For example, the secondary system 108 may analyze LIDAR data or voxel data associated with the LIDAR data to determine if the LIDAR data or voxels represents a ground. In some instances, the ground may correspond to a surface that is drivable by a vehicle. In some examples, the secondary system 108 may determine an inner product between a vector in a height dimension (e.g., a reference direction) of an apparatus carrying a LIDAR system, and a normal vector (such as may be determined based on an Eigenvalue decomposition per voxel), expressed in a common coordinate system. In such an example, the inner product meeting or exceeding a threshold of about 15 degrees, for example, may indicate that the voxel does not comprise the ground. Whereas the inner product being less than the threshold, may indicate that the voxel comprises the ground. Further, in some examples, the secondary system 108 may cluster voxels that are determined to be locally flat voxels to grow a surface corresponding to the ground. In examples, once a ground surface is identified in sensor data, data associated with the ground surface may be removed from the sensor data and the remaining data may be processed (e.g., object detection, segmentation, classification, etc.). In some examples, the primary system 106, the secondary system 108, and/or another system may perform ground removal techniques discussed in U.S. patent application Ser. No. 15/622,905 entitled "Voxel Based Ground Plane Estimation and Object Segmentation," and filed Jun. 14, 2017, the entire contents of which are incorporated herein by reference.

The components of the primary system 106 and/or the secondary system 108 may represent hardware and/or software components. In the context of software, one or more of the components may include instructions that are executable by one or more processors. In context of hardware, one or more of the components may be implemented as integrated circuits (e.g., application-specific integrated circuits (ASICs), etc.), gate arrays (e.g., field-programmable gate arrays (FPGAs), etc.), and so on. In at least some examples, both hardware and software of the primary system 106 and the secondary system 108 may differ.

Figure 3:
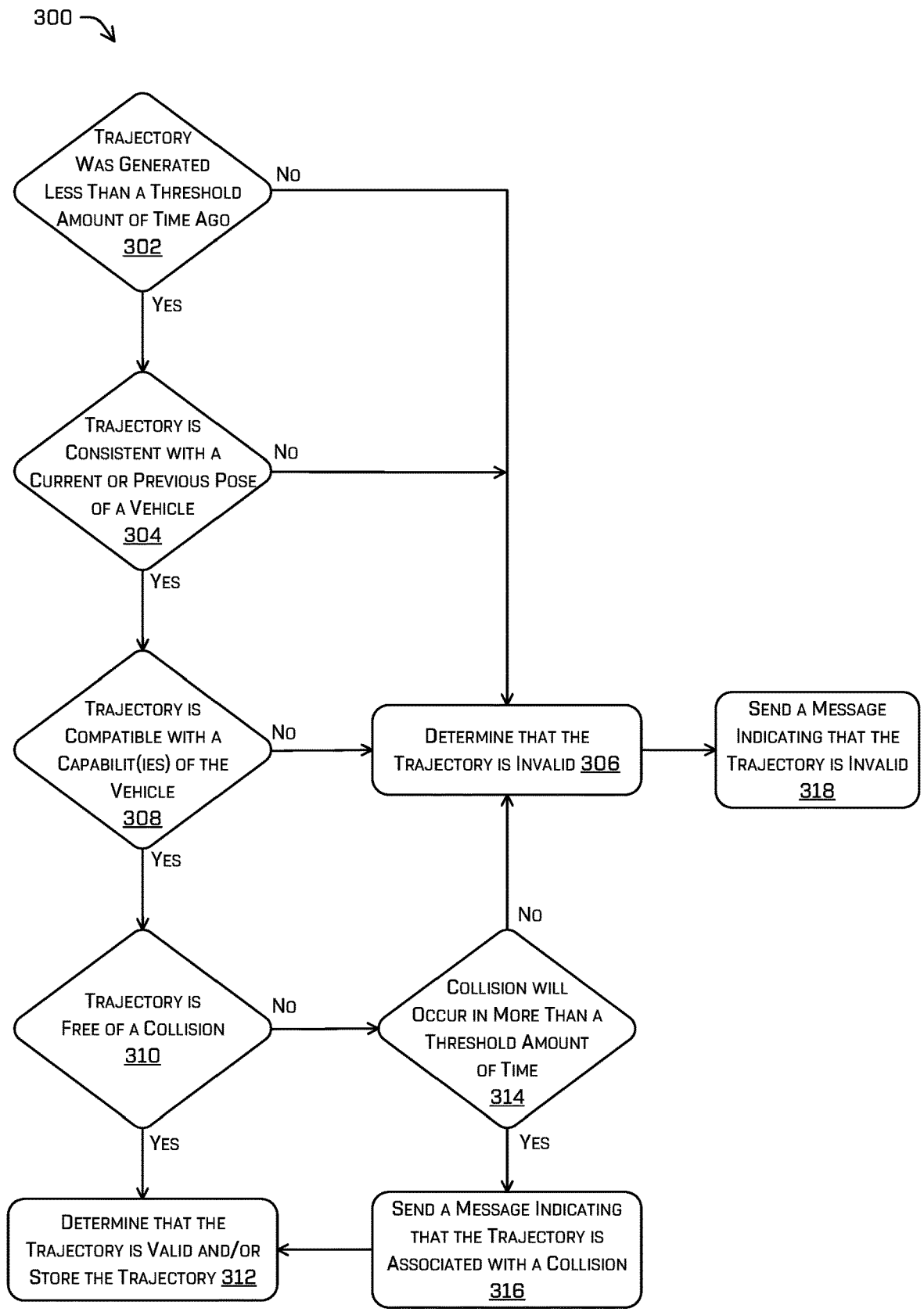
FIG. 3 illustrates an example process to determine if a trajectory for a vehicle is valid or invalid.
Figure 4:
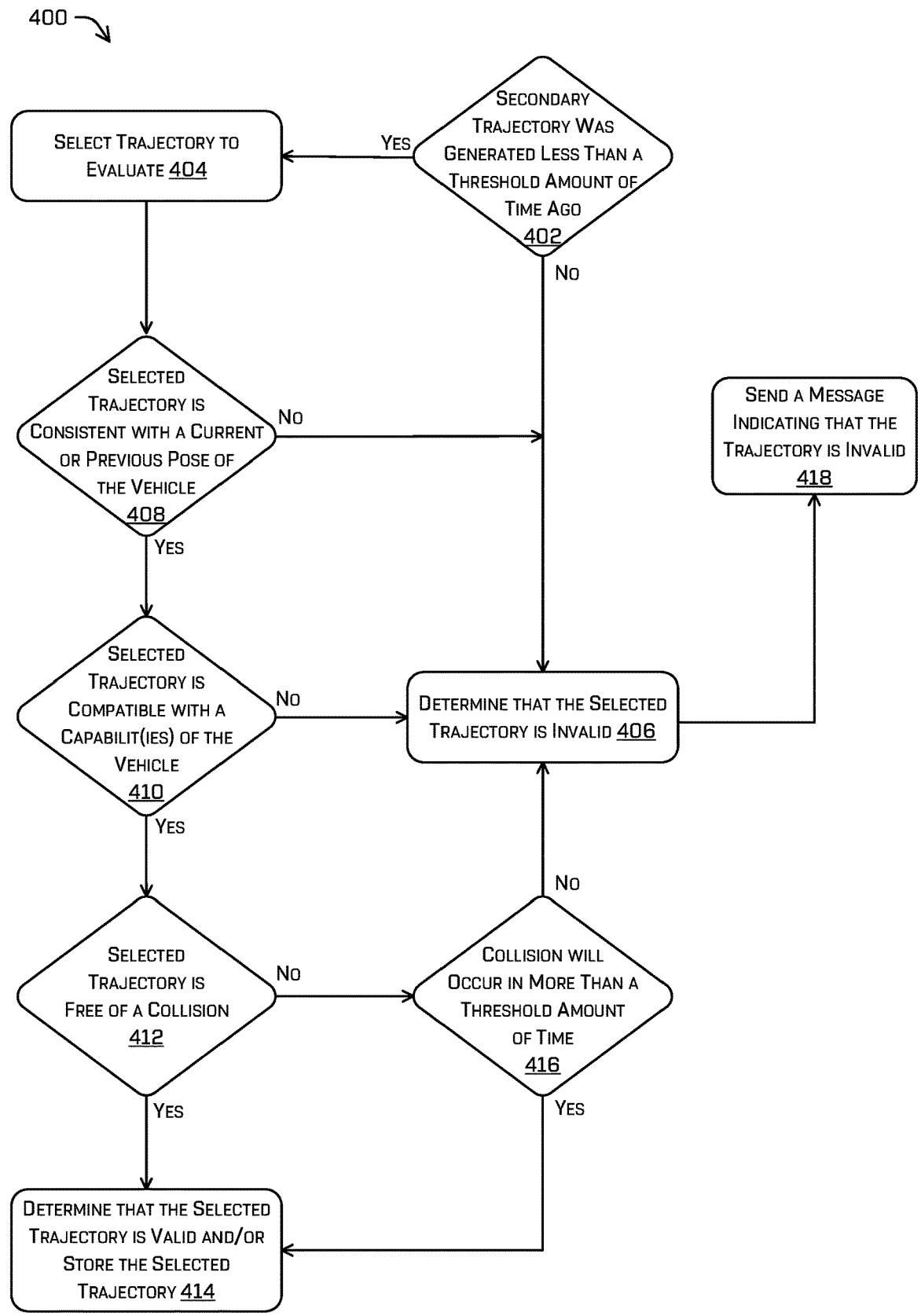
FIG. 4 illustrates an example process to determine if a trajectory for a vehicle is valid or invalid.
Figure 5:
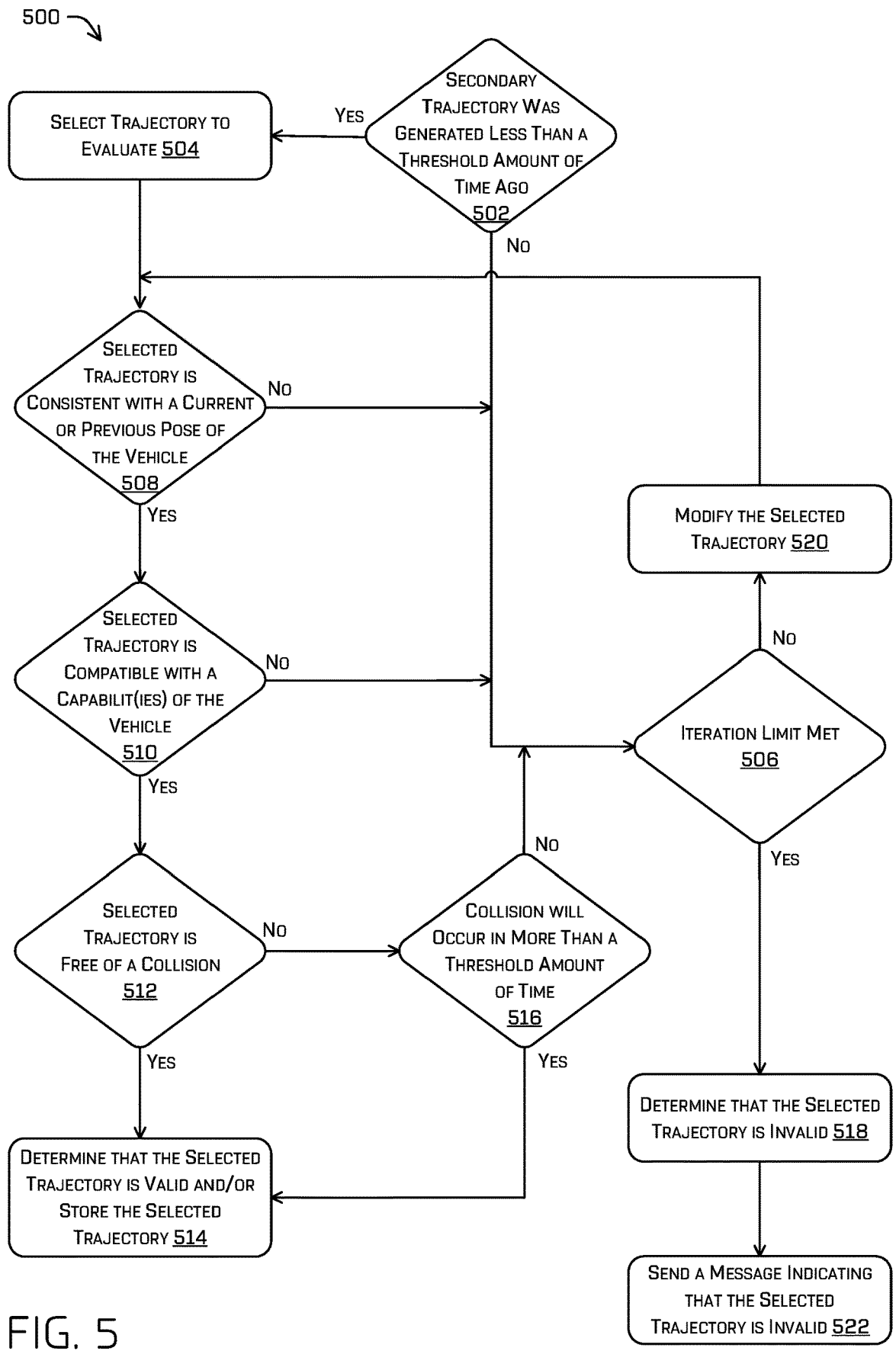
FIG. 5 illustrates an example process to determine if a trajectory for a vehicle is valid or invalid.

FIGS. 3, 4, and 5 illustrate example processes 300, 400, and 500 to perform one or more validation operations. The processes 300, 400, and 500 are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. The processes 300, 400, and/or 500 may be performed by any device or component, such as the autonomous vehicle 102, a service provider (e.g., a computing device of a service provider), or any other device.

FIG. 3 illustrates the example process 300 to determine if a trajectory for a vehicle is valid or invalid. In some examples, the process 300 may be performed for a primary trajectory. For instance, the process 300 may be performed by the trajectory validation component 220(1) of FIG. 2. In other examples, the process 300 may be performed for other trajectories, such as a secondary trajectory, a collision avoidance trajectory, and/or any other trajectory.

At operation 302, a system may determine if a trajectory for a vehicle was generated less than a threshold amount of time ago (e.g., threshold amount of time from a current time). For example, the system may reference a current time and a time that the trajectory was generated (e.g., from data associated with the trajectory and/or from data in a datastore). If the system determines that the trajectory was generated less than the threshold amount of time ago (e.g., indicating that the trajectory is not old), the process 300 may proceed to operation 304. Alternatively, if the system determines that the trajectory was not generated less than the threshold amount of time ago (e.g., indicating that the trajectory is old), the process 300 may proceed to operation 306.

At operation 304, the system may determine if the trajectory is consistent with a current or previous pose of a vehicle. For example, the system may determine if the trajectory would cause more than a threshold amount of change to a current pose and/or one or more previous poses (e.g., more than a threshold amount of change in orientation, position, heading, etc.). In some instances, the trajectory may be compared to multiple previous trajectories, such as the last three trajectories, to determine if there is more than a threshold amount of change from each of the previous trajectories. The system may store trajectories over time, so that one or more previous trajectories may be referenced. If the system determines that the trajectory is consistent with a current or previous pose of the vehicle, the process 300 may proceed to operation 308. Alternatively, if the system determines that the trajectory is inconsistent with a current or previous pose of the vehicle, the process 300 may proceed to operation 306.

At operation 308, the system may determine if the trajectory is compatible with a capabilit(ies) of the vehicle. A capability of the vehicle may be based on hardware and/or software components of the autonomous vehicle 102 and/or limitations of those components. In one example, the system may identify capabilities of the autonomous vehicle 102, such as a maximum steering angle, an amount of time to change from one steering angle to another steering angle, a maximum acceleration, and so on. If the trajectory requires a change past the maximum steering angle, requires the steering to change quicker than an amount of time needed to make a steering angle adjustment, and/or requires an acceleration above a maximum acceleration, the system may determine that the trajectory is incompatible with a capability of the vehicle. If the system determines that the trajectory is compatible with the capabilit(ies) of the vehicle, the process 300 may proceed to operation 310. Alternatively, if the system determines that the trajectory is incompatible with the capabilit(ies) of the vehicle, the process 300 may proceed to operation 306.

At operation 310, the system may determine if the trajectory is free of a collision. For example, the system may determine if the vehicle moving along a vehicle trajectory will collide with an object moving along an object trajectory. If so, the trajectory is associated with a collision. In some examples, the system may determine a probability of the vehicle colliding with the object and determine if the probability meets or exceeds a probability threshold. If the probability meets or exceeds the probability threshold, the system may determine that the vehicle will collide with the object. In examples, operation 310 may be performed for each object detected around the vehicle (e.g., to check for one or more collisions).

If the system determines that the trajectory is collision free, the process 300 may proceed to operation 312. Alternatively, if the system determines that the trajectory is not collision free (e.g., is associated with a collision), the process 300 may proceed to operation 314.

At operation 314, the system may determine if the collision will occur in more than a threshold amount of time. For example, the system may determine a time to last second braking (TTLSB) before colliding with an object. The time to last second braking may be a last possible time when the vehicle needs to initiate a maximum deceleration trajectory to avoid a collision with the object. If the time to last second braking is relatively far out in the future (e.g., more than a threshold amount of time), there may be time for the vehicle to correct the trajectory and avoid initiating a maximum deceleration trajectory. That is, the system does not need to initiate a maximum deceleration trajectory yet. To illustrate, if the time to last second braking for an object is in ten milliseconds, the system may determine that a collision will occur in less than a threshold amount of time. In contrast, if the time to last second braking is in two seconds, the system may determine that a collision will occur in more than a threshold amount of time. In examples, the system may evaluate a potential collision with each object around the vehicle (e.g., each object in an object list).

If the system determines that the collision will occur in more than the threshold amount of time (e.g., there is still time before a time to last second braking), the process 300 may proceed to operation 316. Alternatively, if the system determines that the collision will occur in the threshold amount of time or less than the threshold amount of time, the process 300 may proceed to operation 306.

At operation 306, the system may determine that the trajectory is invalid. In examples, the system may update a state of the trajectory to indicate that the trajectory is invalid. In some instances, the state may indicate why the trajectory is invalid (e.g., is associated with a collision, a time when a collision will occur, is inconsistent with a current/previous pose of the vehicle, is incompatible with a capability of the vehicle, etc.).

In some examples, the process 300 may proceed to operation 318 after performing operation 306. At operation 318, the system may send a message indicating that the trajectory is invalid. For example, the system may be a secondary system and send the message to a primary system to inform the primary system that a trajectory generated by the primary system is invalid. In examples, the message may indicate why the trajectory is invalid.

At operation 316, the system may send a message indicating that the trajectory is associated with a collision. For example, the system may be a secondary system and send the message to a primary system to inform the primary system that a trajectory generated by the primary system is associated with a collision in the future. In examples, the message may indicate one or more of a time to collision, extents of an object associated with a potential collision, a velocity of the object, a location of the object, or a point of collision (e.g., location of the detected collision).

At operation 312, the system may determine that the trajectory is valid and/or may store the trajectory. In examples, the system may update a state of the trajectory to indicate that the trajectory is valid (e.g., is collision free, etc.). In examples, the system may be a secondary system and send a message to a primary system to inform the primary system that the trajectory is valid.

In one example, at 11:30:40 AM, the system may determine that the vehicle would collide with an object in five seconds (at 11:30:45 AM) if a trajectory under evaluation is used. The system may also determine that an amount of time needed to stop the vehicle (e.g., with a maximum deceleration trajectory) and avoid a collision with the object is three seconds (e.g., based on a velocity of the vehicle and/or the object). The system may use such information to determine a last possible time when the vehicle needs to initiate a maximum deceleration trajectory to avoid a collision (also referred to as a time to last second braking (TTLSB)). In this example, the time to last second braking is 11:30:42 AM. Here, the system may determine that the collision will occur in more than a threshold amount of time, send a message indicating such, and designate the trajectory as valid for now. At 11:30:42 AM (two seconds in the future), the system may determine if there is a potential collision for the vehicle (e.g., the vehicle is still on course to collide with the object based on the trajectory or a new trajectory). If a potential collision is detected, the system may initiate a maximum deceleration trajectory (or another maneuver) to avoid the collision.

FIG. 4 illustrates the example process 400 to determine if a trajectory for a vehicle is valid or invalid. In some examples, the process 400 may be performed by the trajectory validation component 220(2) of FIG. 2. In other examples, the process 400 may be performed by other components and/or for other trajectories.

At operation 402, a system may determine if a secondary trajectory for a vehicle was generated less than a threshold amount of time ago. For example, the system may determine if a secondary trajectory currently being output by a primary system was generated less than a threshold amount of time ago. If the system determines that the secondary trajectory was generated less than the threshold amount of time ago, the process 400 may proceed to operation 404. Alternatively, if the system determines that the secondary trajectory was not generated less than the threshold amount of time ago, the process 400 may proceed to operation 406.

At operation 404, the system may select a trajectory to evaluate. In one example, if a primary trajectory is currently being used to control a vehicle, then the system may select a secondary trajectory that passes the evaluation at operation 402 (e.g., a secondary trajectory that was generated less than a threshold amount of time ago). In another example, if a current trajectory that is being used has a lower level than a primary trajectory (e.g., a secondary trajectory, a collision avoidance trajectory, or any other lower-level trajectory), and a release signal has been received to release control to a primary trajectory, then the system may select a secondary trajectory that passes the evaluation at operation 402. In yet another example, if a release signal has not been received to release control from a previous secondary trajectory, the system may select the previous secondary trajectory (e.g., ignoring any updated secondary trajectories received).

As such, at operation 404, the system may select a previously stored secondary trajectory or a secondary trajectory currently output from a primary system. To do so, the system may determine a selected state (e.g., primary trajectory state, secondary trajectory state, collision avoidance trajectory state, etc.) and determine whether or not a release signal has been received to release control to a higher-level trajectory. For example, a secondary trajectory that is currently being output by a primary system may be selected if another secondary trajectory has not been previously latched onto or a release signal has been received. Further, a secondary trajectory that has previously been output by the primary system may be selected if such secondary trajectory has been latched onto and a release signal has not been received.

At operation 408, the system may determine if the selected trajectory is consistent with a current or previous pose of the vehicle. If the system determines that the selected trajectory is consistent with a current or previous pose of the vehicle, the process 400 may proceed to operation 410. Alternatively, if the system determines that the trajectory is inconsistent with a current or previous pose of the vehicle, the process 400 may proceed to operation 406.

At operation 410, the system may determine if the selected trajectory is compatible with a capabilit(ies) of the vehicle. If the system determines that the selected trajectory is compatible with the capabilit(ies) of the vehicle, the process 400 may proceed to operation 412. Alternatively, if the system determines that the selected trajectory is incompatible with the capabilit(ies) of the vehicle, the process 400 may proceed to operation 406.

At operation 412, the system may determine if the trajectory is free of a collision. If the system determines that the trajectory is collision free, the process 400 may proceed to operation 414. Alternatively, if the system determines that the trajectory is not collision free (e.g., is associated with a collision), the process 400 may proceed to operation 416.

At operation 416, the system may determine if the collision will occur in more than a threshold amount of time. If the system determines that the collision will occur in more than the threshold amount of time (e.g., there is still time before a time to last second braking), the process 400 may proceed to operation 414. In some examples when proceeding along the route to operation 414, the system may send a message indicating that the trajectory is associated with a collision, similar to operation 316 in FIG. 3. Alternatively, if the system determines that the collision will occur in the threshold amount of time or less than the threshold amount of time, the process 400 may proceed to operation 406.

At operation 406, the system may determine that the selected trajectory is invalid. In examples, the system may update a state of the selected trajectory to indicate that the selected trajectory is invalid. In some instances, the state may indicate why the selected trajectory is invalid.

In some examples, the process 400 may proceed to operation 418 after performing operation 406. At operation 418, the system may send a message indicating that the trajectory is invalid. For example, the system may be a secondary system and send the message to a primary system to inform the primary system that a trajectory generated by the primary system is invalid. In examples, the message may indicate why the trajectory is invalid.

At operation 414, the system may determine that the selected trajectory is valid and/or may store the selected trajectory. In examples, the system may update a state of the selected trajectory to indicate that the selected trajectory is valid. In at least some examples such a determination may also be sent to the primary system indicating that the secondary trajectory is valid. In examples, the system may be a secondary system and send a message to a primary system to inform the primary system that the trajectory is valid.

FIG. 5 illustrates the example process 500 to determine if a trajectory for a vehicle is valid or invalid. In some examples, the process 500 may be performed by the trajectory validation component 220(3) of FIG. 2. In other examples, the process 500 may be performed by other components and/or for other trajectories.

At operation 502, a system may determine if a secondary trajectory for a vehicle was generated less than a threshold amount of time ago. For example, the system may determine if a secondary trajectory currently being output by a primary system was generated less than a threshold amount of time ago. If the system determines that the secondary trajectory was generated less than the threshold amount of time ago, the process 500 may proceed to operation 504. Alternatively, if the system determines that the secondary trajectory was not generated less than the threshold amount of time ago, the process 500 may proceed to operation 506.

At operation 504, the system may select a trajectory to evaluate. In one example, if a primary trajectory is currently being used to control a vehicle, then the system may select a secondary trajectory that passes the evaluation at operation 502 (e.g., a secondary trajectory that was generated less than a threshold amount of time ago). In another example, if a current trajectory that is being used has a lower level than a primary trajectory (e.g., a secondary trajectory, a collision avoidance trajectory, or any other lower-level trajectory), and a release signal has been received to release control to a primary trajectory, then the system may select a secondary trajectory that passes the evaluation at operation 502. In yet another example, if a release signal has not been received to release control from a previous collision avoidance trajectory, the system may select the previous collision avoidance trajectory (e.g., by disregarding any updates and/or not updating the collision avoidance trajectory).

As such, at operation 504, the system may select a previously stored collision avoidance trajectory or a secondary trajectory currently output from a primary system. To do so, the system may determine a selected state (e.g., primary trajectory state, secondary trajectory state, collision avoidance trajectory state, etc.) and determine whether or not a release signal has been received to release control to a higher-level trajectory. For example, a secondary trajectory that is currently being output by a primary system may be selected if another secondary trajectory has not been previously latched onto, a release signal has been received, or the system otherwise determines that additional updates should be ignored (e.g., where the system may be unable to verify the integrity of the additional secondary trajectory). Further, a previous collision avoidance trajectory may be selected if such collision avoidance trajectory has been latched onto and a release signal has not been received. In some examples, a collision avoidance trajectory (determined/output by the process 500, as discussed below) may be a secondary trajectory. In other examples, a collision avoidance trajectory (determined/output by the process 500) may be a modified secondary trajectory.

At operation 508, the system may determine if the selected trajectory is consistent with a current or previous pose of the vehicle. If the system determines that the selected trajectory is consistent with a current or previous pose of the vehicle, the process 500 may proceed to operation 510. Alternatively, if the system determines that the trajectory is inconsistent with a current or previous pose of the vehicle, the process 500 may proceed to operation 506.

At operation 510, the system may determine if the selected trajectory is compatible with a capabilit(ies) of the vehicle. If the system determines that the selected trajectory is compatible with the capabilit(ies) of the vehicle, the process 500 may proceed to operation 512. Alternatively, if the system determines that the selected trajectory is incompatible with the capabilit(ies) of the vehicle, the process 500 may proceed to operation 506.

At operation 512, the system may determine if the trajectory is free of a collision. If the system determines that the trajectory is collision free, the process 500 may proceed to operation 514. Alternatively, if the system determines that the trajectory is not collision free (e.g., is associated with a collision), the process 500 may proceed to operation 516.

At operation 516, the system may determine if the collision will occur in more than a threshold amount of time. If the system determines that the collision will occur in more than the threshold amount of time (e.g., there is still time before a time to last second braking), the process 500 may proceed to operation 514. Alternatively, if the system determines that the collision will occur in the threshold amount of time or less than the threshold amount of time, the process 500 may proceed to operation 506.

Although illustrated in FIG. 5, in some examples operation 516 may not be performed. For example, if a trajectory is associated with a collision, the process 500 may proceed to operation 506.

At operation 514, the system may determine that the selected trajectory is valid and/or may store the selected trajectory. In examples, the system may update a state of the selected trajectory to indicate that the selected trajectory is valid. In examples, the system may be a secondary system and send a message to a primary system to inform the primary system that the trajectory is valid.

At operation 506, the system may determine if an iteration limit (sometimes referred to as a limit) is met. The iteration limit may be used so that if the system is unable to determine an acceptable collision avoidance trajectory within a number of iterations, the collision avoidance trajectory is considered invalid. This may limit the amount of time spent attempting to find an acceptable collision avoidance trajectory. In examples, the iteration limit may be based on a time to last second braking (e.g., set to a number of iterations that can be reached before a time to last second braking). In examples, in each iteration, operation 520 is performed.

If the system determines that the iteration limit is met, the process 500 may proceed to operation 518. Alternatively, if the system determines that the iteration limit is not met, the process 500 may proceed to operation 520.

At operation 520, the system may modify the selected trajectory and return to perform operation 508 and so on. In some examples, the system may add an amount of deceleration that is needed to cause the vehicle to stop before colliding with an object. This may be based on a current velocity of the vehicle, a predicted trajectory of the object, and/or a current or predicted velocity of the object. Alternatively, or additionally, the system may modify the selected trajectory in another manner, such as by changing a steering angle, adding acceleration, etc. This may also avoid a collision with an object. In examples, modifying the selected trajectory may create a collision avoidance trajectory.

At operation 518, the system may determine that the selected trajectory is invalid. In examples, the system may update a state of the selected trajectory to indicate that the selected trajectory is invalid. In some instances, the state may indicate why the selected trajectory is invalid.

In some examples, the process 500 may proceed to operation 522 after performing operation 518. At operation 522, the system may send a message indicating that the selected trajectory is invalid. For example, the system may be a secondary system and send the message to a primary system to inform the primary system that a trajectory is invalid. In examples, the message may indicate why the trajectory is invalid.

In examples, a trajectory that is determined to be valid at operation 514 may be a secondary trajectory without any deceleration (or other modification) applied at operation 520. For instance, if no modification is necessary to a secondary trajectory selected at operation 504, since the secondary trajectory passes the checks at operations 508, 510, and 512, the secondary trajectory may be determined/output by the process 500. In other examples, a trajectory that is determined to be valid at operation 514 may be a secondary trajectory with deceleration (or other modification) applied. In examples, either type of trajectory that is determined/output (and/or stored for future reference) by performing the process 500 may be referred to as a collision avoidance trajectory.

In examples, if a maximum amount of deceleration/modification is applied to a selected trajectory (e.g., in view the capabilities of the vehicle and by performing operation 520 one or more times), and the selected trajectory is still associated with a collision, the system may override the detected collision and proceed to determine that the selected trajectory is valid at operation 514. This may allow the modified trajectory to be used (which is a collision avoidance trajectory with a maximum amount of deceleration/modification applied). In examples, this may be more beneficial than designating the modified trajectory as invalid and initiating a maximum deceleration trajectory (e.g., an emergency stop trajectory), since a maximum deceleration trajectory may lock a steering angle of the vehicle while the collision avoidance trajectory may maintain lateral tracking (e.g., cause the vehicle to continue along the collision avoidance trajectory). In examples, if the collision avoidance trajectory with the maximum amount of deceleration/modification applied is selected to be used (e.g., determined/output from the process 500), a signal may be sent to one or more components of the vehicle to pre-tension a seatbelt, prepare an airbag for deployment, etc.

Figure 6:
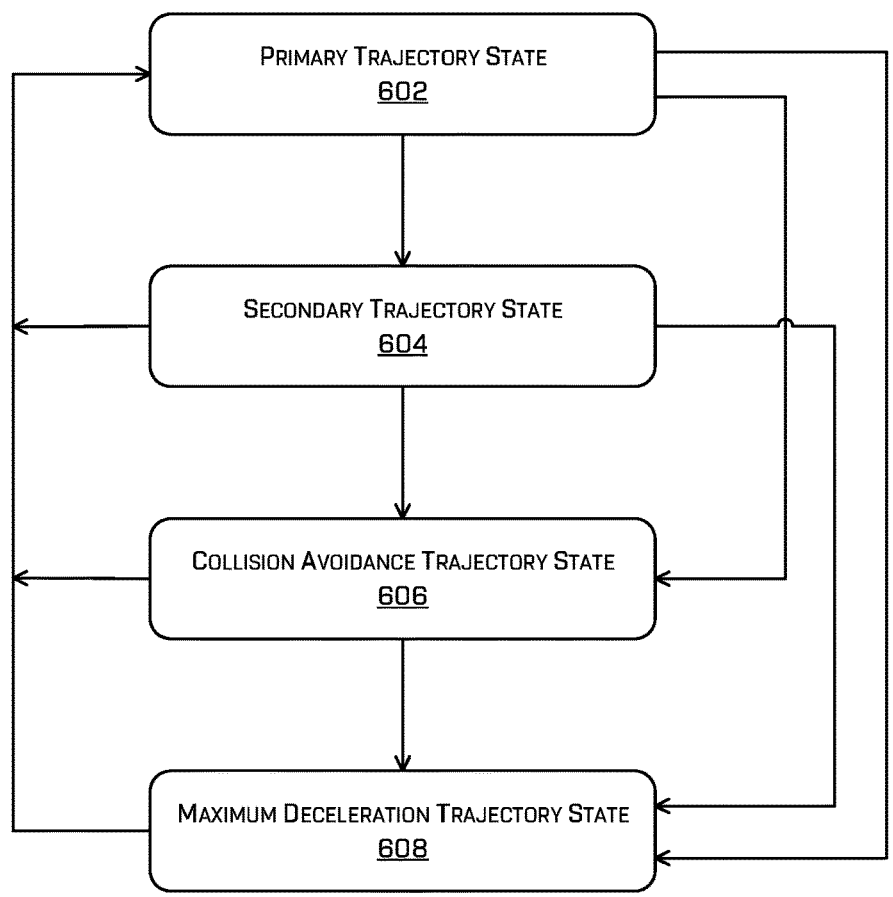
FIG. 6 illustrates an example hierarchy of states that may be implemented by a secondary system.

FIG. 6 illustrates an example hierarchy 600 of states 602-608 that may be implemented by a secondary system, such as by the trajectory selector 222. For example, the primary trajectory state 602 may be active when a primary trajectory is selected to control a vehicle, the secondary trajectory state 604 may be active when a secondary trajectory is selected, the collision avoidance trajectory state 606 may be active when a collision avoidance trajectory is selected, and the maximum deceleration trajectory state 608 may be active when a maximum deceleration trajectory (e.g., emergency stop trajectory) is selected. In FIG. 6, the hierarchy 600 is ordered according to levels, with the highest level state being at the top (the primary trajectory state 602) and the lowest level state being at the bottom (the maximum deceleration trajectory state 608).

The secondary system may generally transition to a lower-level state when a higher-level state is found to be invalid. The secondary system may transition from a current state to any lower state, as illustrated by the lines going down. In at least some examples, the current state may be associated with the highest valid state with no invalid states below (e.g., if a secondary trajectory state 604 is invalid, yet a collision avoidance trajectory state is invalid, such a system may default to the maximum deceleration trajectory state 608). Further, in examples, in order to transition up the hierarchy 600, the secondary system may wait to receive a signal to release control from a lower-level state. For instance, if the secondary system is currently controlling the vehicle based on a collision avoidance trajectory, and thus, the secondary system is operating in the collision avoidance trajectory state 606, the secondary system may transition back to the primary trajectory state 602 when a signal is received to release control back to the primary trajectory state 602 (where the vehicle is controlled based on a primary trajectory).

Figure 7A:
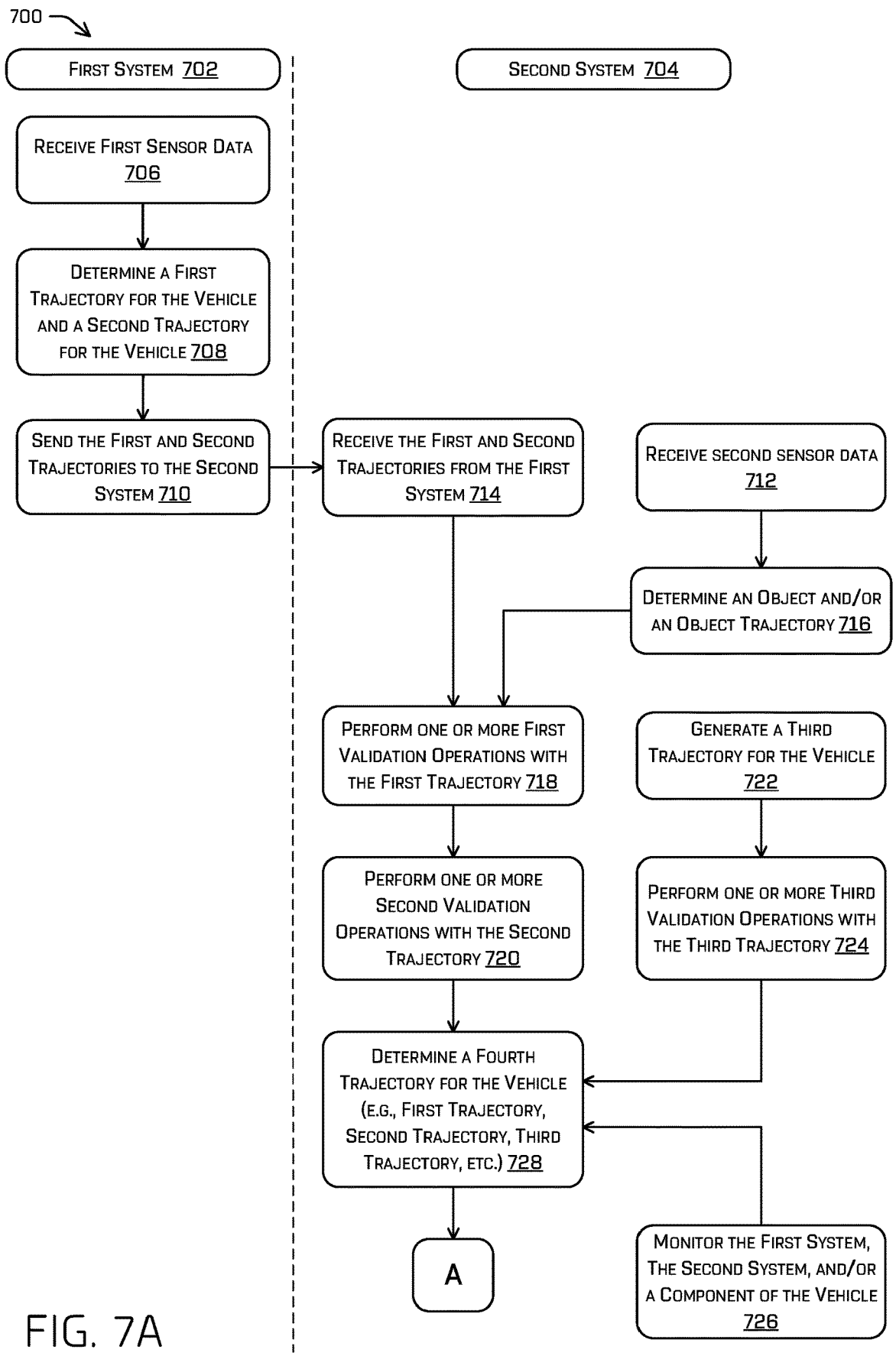
FIGS. 7A-7B illustrate an example process to perform the techniques discussed herein.
Figure 7B:
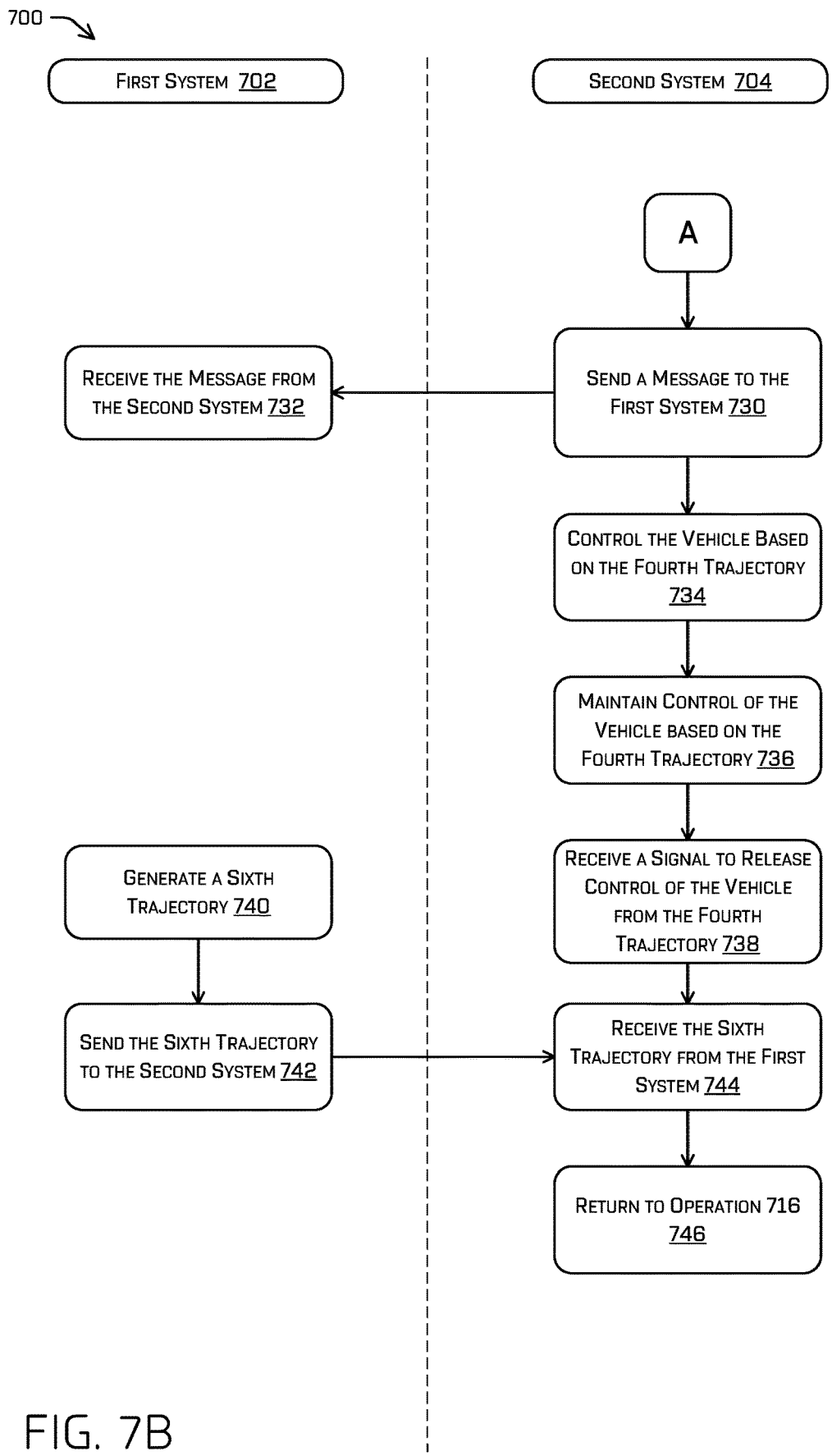

FIGS. 7A-7B illustrate an example process 700 to perform the techniques discussed herein. The process 700 is illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. The process 700 may be performed by any device or component, such as the autonomous vehicle 102, a service provider (e.g., a computing device of a service provider), or any other device.

For ease of illustration, the process 700 will be discussed as being performed by a first system 702 (sometimes referred to as a first component) and a second system 704 (sometimes referred to as a second component). For example, the first system 702 may comprise the primary system 106 of FIGS. 1 and 2, while the second system 704 may comprise the secondary system 108 of FIGS. 1 and 2.

In FIG. 7A, at operation 706, the first system 702 may receive first sensor data. For example, the first system 702 may receive one or more of LIDAR data, RADAR data, image data, depth data (time of flight, structured light, etc.), wheel encoder data, IMU data, etc. from a sensor(s) of a vehicle.

At operation 708, the first system 702 may determine a first trajectory for the vehicle and a second trajectory for the vehicle. For example, the first system 702 may analyze the first sensor data to generate the first and second trajectories. In examples, the first system 702 may perform localization, perception, prediction, and/or planning operations to generate the first and second trajectories. In examples, the second trajectory may be a contingent trajectory for the first trajectory.

At operation 710, the first system 702 may send the first and second trajectories to the second system 704.

At operation 712, the second system 704 may receive second sensor data. For example, the second system 704 may receive one or more of LIDAR data, RADAR data, image data, wheel encoder data, IMU data, depth data (time of flight, structured light, etc.), etc. from the sensor(s) of the vehicle. In some examples, the second sensor may include a subset of the first sensor data, such as LIDAR data, RADAR data, wheel encoder data, IMU data, GPS data, and/or time of flight data. In other examples, the second sensor data may be the same or include more data than the first sensor data.

At operation 714, the second system 704 may receive the first and second trajectories from the first system 702.

At operation 716, the second system 704 may determine an object in an environment and/or determine an object trajectory for the object. For example, the second system 704 may detect the object and/or predict the object trajectory for the object based on the second sensor data.

At operation 718, the second system 704 may perform one or more first validation operations with the first trajectory. For example, the second system 704 may perform the one or more first validation operations with the first trajectory for the vehicle and the object trajectory for the object to determine a first state associated with the first trajectory. In examples, the one or more first validation operations comprise determining whether the first trajectory was generated less than a threshold amount of time ago, determining whether the first trajectory is consistent with a current or previous pose of the vehicle, determining whether the first trajectory is compatible with a capability of the vehicle, and/or determining whether the vehicle moving along the first trajectory will collide with the object moving along the object trajectory (e.g., performing first collision detection). In examples, the first state indicates that the first trajectory is valid, the first trajectory is invalid, or the first trajectory will be invalid due to an estimated collision occurring in more than a threshold amount of time. In examples, the second system 704 may evaluate the first trajectory for each object detected in an environment (e.g., determine if there is a potential collision for each object detected). Here, the first trajectory may be valid if there are no collisions, and may be invalid if there is just one collision. In at least some examples, the objects selected for collision detection may be determined in order from closest (i.e., most proximate potential collision) to furthest.

At operation 720, the second system 704 may perform one or more second validation operations with the second trajectory. For example, the second system 704 may perform the one or more second validation operations with the second trajectory for the vehicle and the object trajectory for the object to determine a second state associated with the second trajectory. In examples, the one or more second validation operations comprise determining whether the second trajectory was generated less than a threshold amount of time ago, determining whether the second trajectory is consistent with a current or previous pose of the vehicle, determining whether the second trajectory is compatible with a capability of the vehicle, and/or determining whether the vehicle moving along the second trajectory will collide with the object moving along the object trajectory (e.g., performing second collision detection). In examples, the second state indicates that the second trajectory is valid, the second trajectory is invalid, or the second trajectory will be invalid due to an estimated collision occurring in more than a threshold amount of time. In examples, the second system 704 may evaluate the second trajectory for each object detected in an environment.

At operation 722, the second system 704 may generate a third trajectory for the vehicle. For example, the second system 704 may generate the third trajectory based on the second trajectory (or the first trajectory, in some cases) and/or independently from a previously generated trajectory. The third trajectory may comprise a deceleration or other modification along the second trajectory and/or any other maneuver (e.g., a collision avoidance trajectory). In examples, the second system 704 may apply a deceleration/modification to the second trajectory any number of times based on an iteration limit and/or apply a deceleration/modification up to a maximum amount of deceleration/modification that is available to apply.

At operation 724, the second system 704 may perform one or more third validation operations with the third trajectory. For example, the second system 704 may perform the one or more third validation operations with the third trajectory for the vehicle and the object trajectory for the object to determine a third state associated with the third trajectory. In examples, the one or more third validation operations comprise determining whether the third trajectory was generated less than a threshold amount of time ago, determining whether the third trajectory is consistent with a current or previous pose of the vehicle, determining whether the third trajectory is compatible with a capability of the vehicle, and/or determining whether the vehicle moving along the third trajectory will collide with the object moving along the object trajectory (e.g., performing third collision detection). In examples, the second state indicates that the third trajectory is valid, the third trajectory is invalid, or the third trajectory will be invalid due to an estimated collision occurring in more than a threshold amount of time.

In examples, any number of the one or more first validation operations, the one or more second validation operations, and/or the one or more third validations operations may be the same. In other examples, any number of validation operations may be different.

At operation 726, the second system 704 may monitor the first system 702, the second system 704, and/or a component of the vehicle. Based on the monitoring, the second system 704 may determine an error with the first system 702, the second system 704, and/or the component of the vehicle.

At operation 728, the second system 704 may determine a fourth trajectory for the vehicle. For example, the second system 704 may, based on the first state, the second state, and/or the third state, select, as the fourth trajectory, the first trajectory, the second trajectory, the third trajectory, or a fifth trajectory (e.g., a maximum deceleration trajectory).

In examples, the second system 704 may select the first trajectory when the first state indicates that the first trajectory is valid. Further, in examples, the second system 704 may select the second trajectory when (i) the first state indicates that the first trajectory is invalid (e.g., associated with an estimated collision in less than a threshold amount of time) and the second state indicates that the second trajectory is valid, or (ii) an error is detected with the first system 702, the second system 704, and/or a component of the vehicle and the second state indicates that the second trajectory is valid.

Moreover, in examples, the second system 704 may select the third trajectory (e.g., collision avoidance trajectory) when (i) the first state indicates that the first trajectory is invalid, the second state indicates that the second trajectory is invalid, and the third state indicates that the third trajectory is valid, (ii) an error is detected with the first system 702, the second system 704, and/or a component of the vehicle, the second state indicates that the second trajectory is invalid, and the third state indicates that the third trajectory is valid, or (iii) the first state indicates that the first trajectory is invalid, the second state indicates that the second trajectory is invalid, the third trajectory is associated with a collision, the third trajectory is associated with a maximum amount of deceleration/modification, and an iteration limit has not been met in applying a deceleration/modification to the third trajectory. As such, in some examples, the second system 704 may determine if a maximum amount of deceleration/modification has been applied to generate the third trajectory and/or if the iteration limit has been met.

Further, in examples, the second system 704 may select a maximum deceleration trajectory (e.g., an emergency stop trajectory) if the first trajectory, the second trajectory, or the third trajectory are not selected as discussed above (e.g., the first trajectory is invalid, the second trajectory is invalid, and the third trajectory is invalid). As noted above, the third trajectory may be invalid due to an iteration limit being met in applying a deceleration/modification to the third trajectory.

In FIG. 7B, at operation 730, the second system 704 may send a message to the first system 702 (e.g., if a trajectory is invalid). The message may indicate that a trajectory is invalid and/or that the second system 704 will intervene if control of the vehicle is maintained based on the trajectory. In some examples, the message may not be sent (e.g., where the first trajectory is selected). In at least some examples, such message data may include, for example, a time to collision, a point of collision, information about the potentially colliding object (e.g., any one or more of an extent of an object, object identifier, object position, object velocity), etc. In at least some examples, one or more messages are constantly sent to the first system 702, regardless of validity of any trajectory and may indicate validity, one or more outputs from processes (perception, localization, validation, etc.), time to collision, and the like.

Additionally, or alternatively, in examples, if a maximum deceleration trajectory or a collision avoidance trajectory (with a maximum amount of deceleration/modification applied) is selected at operation 728, a message or signal may be sent to one or more components of the vehicle to pre-tension a seatbelt, prepare an airbag for deployment, etc.

At operation 732, the first system 702 may receive the message from the second system 704. In examples, the first system 702 may adjust a trajectory, such as a primary trajectory, based on the message.

At operation 734, the second system 704 may control the vehicle based on the fourth trajectory. For example, the second system 704 may send a signal to a drive manager, a system controller(s), etc. instructing the control the vehicle based on the fourth trajectory.

At operation 736, the second system 704 may maintain control of the vehicle based on the fourth trajectory. For example, the second system 704 may maintain the second system 704 in a state that is latched onto the second trajectory, the third trajectory, and/or a maximum deceleration trajectory, which may include continuing to send a signal to the system controller(s).

At operation 738, the second system 704 may receive a signal to release control of the vehicle from the fourth trajectory. In examples, the signal may be received from a teleoperations system or another system. The signal may indicate that the vehicle is clear of a collision or otherwise clear to return to normal operation. For example, if the fourth trajectory caused the vehicle to come to a stop due to a potential collision, the signal may indicate that its safe for the vehicle to move again.

At operation 740, the first system 702 may generate a sixth trajectory. The sixth trajectory may comprise a primary/main trajectory.

At operation 742, the first system 702 may send the sixth trajectory to the second system 704.

At operation 744, the second system 704 may receive the sixth trajectory from the first system 702.

At operation 746, the second system 704 return to operation 716 to evaluate the sixth trajectory and control the vehicle based on the sixth trajectory if valid.

Figure 9:
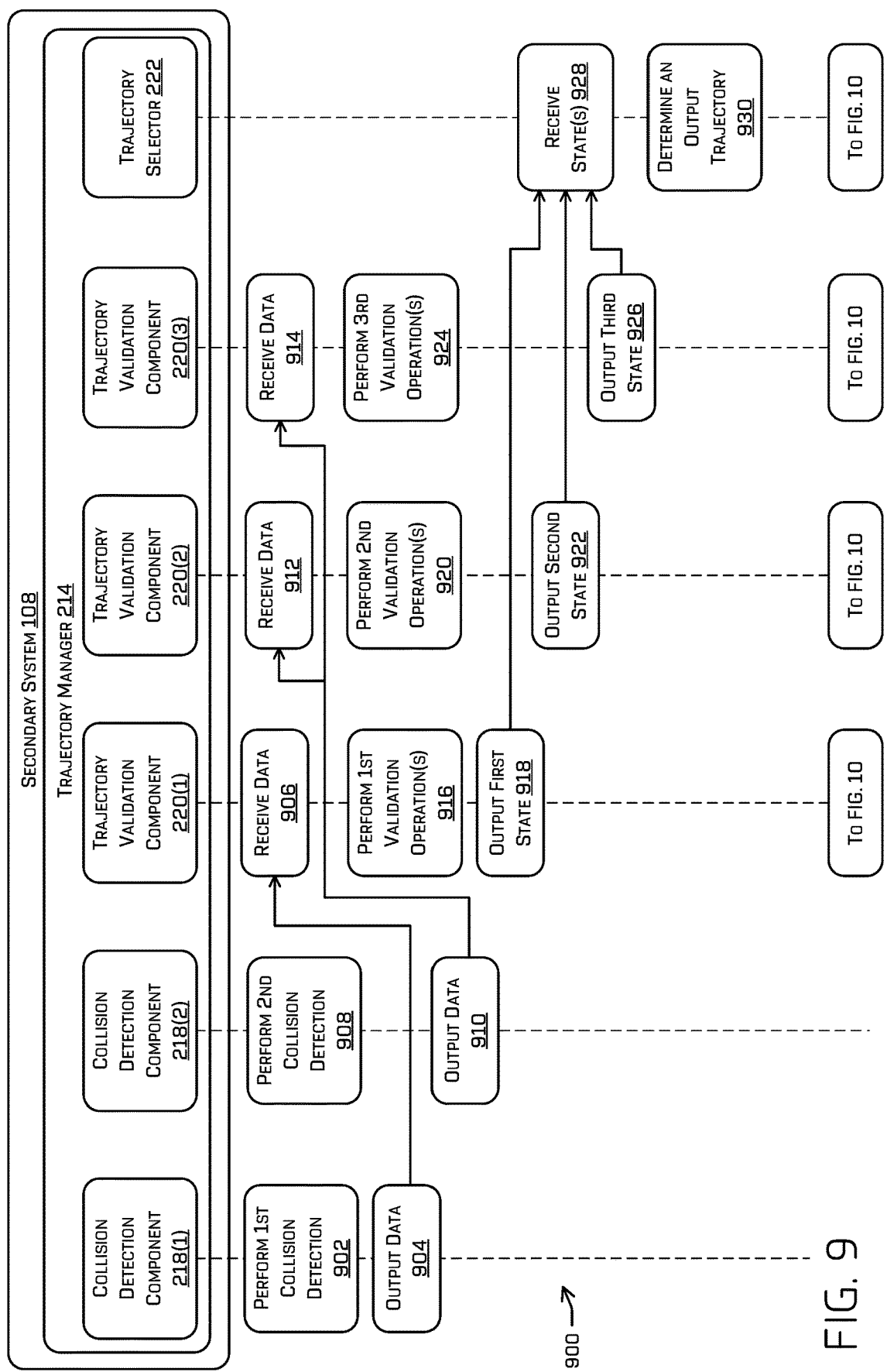
FIG. 9 illustrates an example process that may be performed by various components of a primary system and/or a secondary system.
Figure 10:
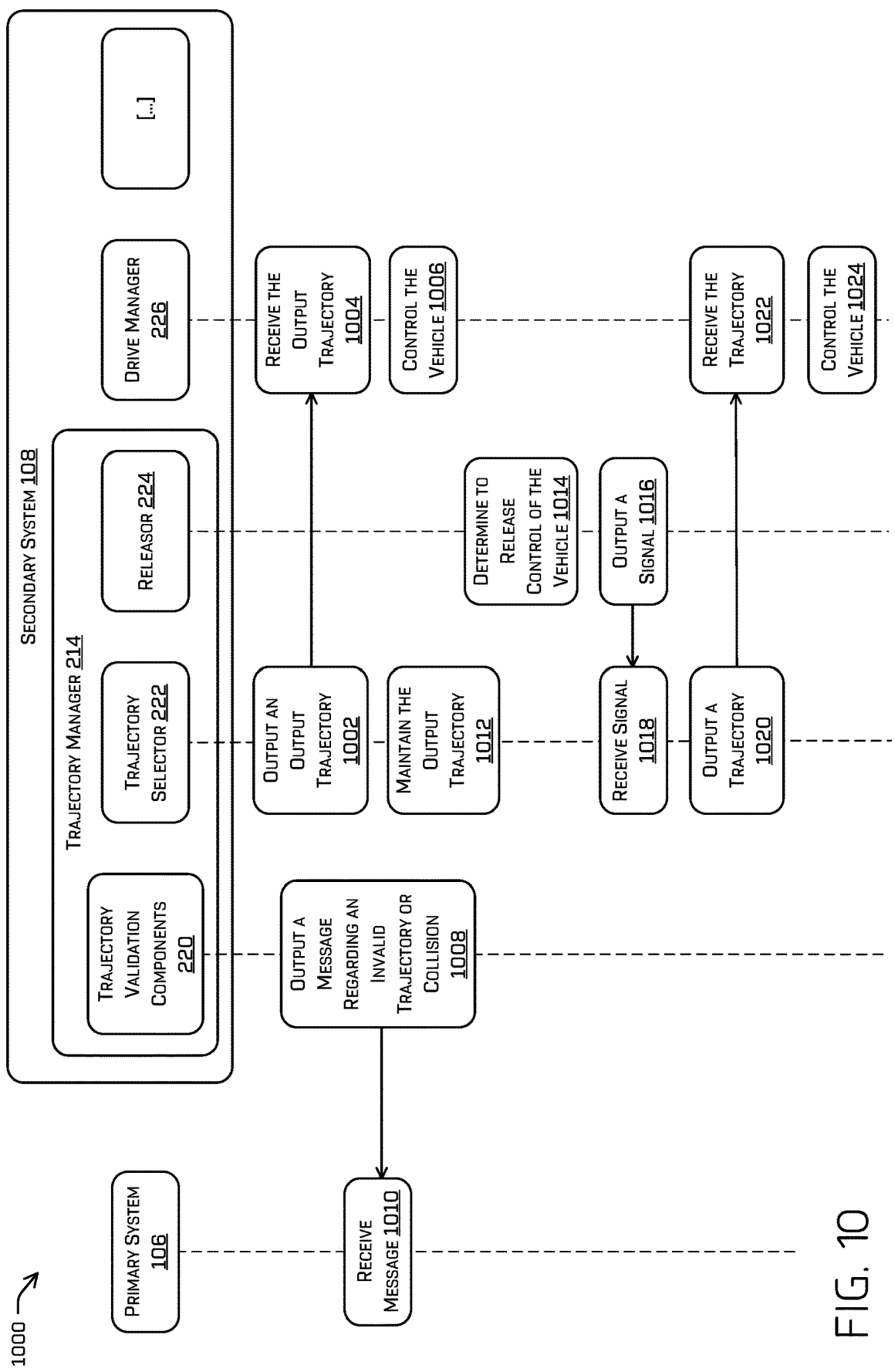
FIG. 10 illustrates an example process that may be performed by various components of a primary system and/or a secondary system.

FIGS. 8-10 illustrate example processes 800, 900, and 1000 to perform the techniques discussed herein. The processes 800, 900, and 1000 are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. The processes 800, 900, and 1000 may be performed by any device or component, such as the autonomous vehicle 102, a service provider (e.g., a computing device of a service provider), or any other device.

FIG. 8 illustrates the example process 800 that may be performed by various components of a primary system and/or a secondary system. For ease of illustration, the process 800 is illustrated in the context of FIGS. 1 and/or 2. However, the process 800 may be performed in other environments.

In examples, the primary system 106 implements first techniques to perform at least one of first object detection, first object segmentation, first object classification, or first object tracking. Meanwhile, the secondary system 108 implements second techniques to perform at least one of second object detection, second object segmentation, second object classification, or second object tracking. The first and second techniques may be similar, the same, or different.

At operation 802, the primary system 106 may receive sensor data from one or more sensors. For example, the primary system 106 may receive the sensor data 114 from the sensor(s) 104 of the autonomous vehicle 102.

At operation 804, the primary system 106 may generate a trajectory(ies) for a vehicle. For example, the primary system 106 may generate the primary trajectory 116 and/or the secondary trajectory 118 based at least in part on the sensor data 114.

At operation 806, the primary system 106 may output the trajectory(ies). For example, the primary system 106 may send the primary trajectory 116 and/or the secondary trajectory 118 to the secondary system 108, such as the trajectory manager 214.

At 808, the trajectory manager 214 may receive the trajectory(ies). For example, the trajectory manager 214 may receive the primary trajectory 116 and/or the secondary trajectory 108 from the primary system 106.

At operation 810, the localizer 210 may receive at least a portion of the sensor data. For example, the localizer 210 may receive at least a portion of the sensor data 120 from the sensor(s) 104. The localizer 210 may be communicatively coupled to the trajectory manager 214, the perceiver 212, the drive manager 226, and/or any other component.

At operation 812, the localizer 210 may determine a pose of the vehicle. For example, the localizer 210 may determine a pose of the autonomous vehicle 102 based at least in part on the sensor data 120. As above, such pose may be either relative to a map (which may be received from the primary system 106), or relative to one or more previous poses of the autonomous vehicle 102.

At operation 814, the localizer 210 may output data indicating the pose of the vehicle. For example, the localizer 210 may send data indicating the pose of the autonomous vehicle 102 to the perceiver 212, the trajectory manager 214, and/or the drive manager 226.

At operation 816, the drive manager 226 may receive the data indicating the pose of the vehicle from the localizer 210. The drive manager 226 may be communicatively coupled to the localizer 210, the trajectory manager 214, the monitor 216, a drive system, and/or any other component, At operation 818, the trajectory manager 214 may receive the data indicating the pose of the vehicle from the localizer 210.

At operation 820, the perceiver 212 may receive the data indicating the pose of the vehicle from the localizer 210. The perceiver 212 may be communicatively coupled to the localizer 210, the trajectory manager 214, and/or any other component.

At operation 822, the perceiver 212 may receive at least a portion of the sensor data. For example, the perceiver 212 may receive at least a portion of the sensor data 120 from the sensor(s) 104. In at least some examples, the portion of sensor data received at 822 may differ from that portion received at 810.

At operation 824, the perceiver 212 may determine an object in an environment, a track for the object, and/or an object trajectory for the object. For example, the perceiver 212 may determine presence of the object 126, a characteristic(s) of the object 126, a track for the object 126, and/or an object trajectory for the object 126 based at least in part on the sensor data 120.

At operation 826, the perceiver 212 may output data indicating a characteristic of the object, the track for the object, and/or the object trajectory. For example, the perceiver 212 may send data indicating a characteristic(s) of the object 126 (e.g., extent, velocity, acceleration, position, orientation, etc.), a track for the object 126, and/or an object trajectory for the object 126 to the trajectory manager 214.

At operation 828, the trajectory manager 214 may receive the data indicating the characteristic of the object, the track for the object, and/or the object trajectory from the perceiver 212.

At operation 830, the trajectory manager 214 may receive at least a portion of the sensor data. For example, the trajectory manager 214 may receive at least a portion of the sensor data 120 from the sensor(s) 104. In some examples, the portion received at 830 may differ from either portion received at 810 or 812. The trajectory manager 214 may be communicatively coupled to the localizer 210, the perceiver 212, the monitor 216, the drive manager 226, the primary system 106, and/or any other component or system.

At operation 832, the monitor 216 may monitor the primary system 106 and/or any other component of the vehicle. For example, the monitor 216 may receive a signal from a component of the primary system 106/secondary system 108, a signal from the drive manager 226 (or an actuator (brakes, steering, etc.)), a signal from a service provider (e.g., remote device) indicating a hardware or software failure (e.g., diagnostics information), a signal from a battery of the autonomous vehicle 102 or other component associated with providing power to the primary system 106/secondary system 108, etc. The monitor 216 may be communicatively coupled to the primary system 106, the trajectory manager 214, the drive manager 226, and/or any component of the vehicle, such as the autonomous vehicle 102.

At operation 834, the monitor 216 may determine that an error has occurred. For example, the monitor 216 may determine that an error has occurred if there is a hardware and/or software failure for the primary system 106, the secondary system 108, and/or another component (e.g., a failure of the sensor(s) 104, an actuator, etc.), if power to the primary system 106, the secondary system 108, and/or another component is disrupted, if a signal has not been received from the primary system 106, the secondary system 108, and/or another component for some time (e.g., longer than a period of time, indicating that the primary system 106 is experiencing a problem), etc.

At operation 836, the monitor 216 may output a signal indicating the error. For example, the monitor 216 may send a signal to the trajectory manager 214 and/or the drive manager 226 indicating that an error has occurred.

At operation 838, the trajectory manager 214 may receive the signal from the monitor 216.

At operation 840, the drive manager 226 may receive the signal from the monitor 216. In examples, if the error is severe (e.g., a predetermined type of error, an error with the secondary system 108, a combination of errors with components, etc.), the drive manager 226 may control the autonomous vehicle 102 based at least in part on a maximum deceleration trajectory or another trajectory.

At operation 842, the primary system 106 and the monitor 216 may communicate data. For example, the monitor 216 may receive data regarding an error at the primary system 106. Such data may be used at operation 834 to determine that an error has occurred. In another example, the monitor 216 may send data to the primary system 106 indicating that the monitor 216 has detected an error.

FIG. 9 illustrates the example process 900 that may be performed by various components of a primary system and/or a secondary system. For ease of illustration, the process 900 is illustrated in the context of FIGS. 1 and/or 2. However, the process 900 may be performed in other environments. In examples, the process 900 may be performed after the process 800 is performed. In other examples, the process 900 may be performed at other times.

At operation 902, the collision detection component 218(1) may perform first collision detection. For example, the collision detection component 218(1) may receive the primary trajectory 116 and determine if the primary trajectory 116 is associated with a collision with one or more objects. The determination may be based on data received from the localizer 210, the perceiver 212, and/or a component of the primary system 106 (in some cases). The collision detection component 218(1) may be communicatively coupled to the primary system 106, the trajectory validation component 220(1), and/or any other component.

At operation 904, the collision detection component 218(1) may output data regarding the first collision detection. For example, the collision detection component 218(1) may output data to the trajectory validation component 220(1) indicating if a collision is detection, a probability of a collision, etc.

At operation 906, the trajectory validation component 220(1) may receive the data from the collision detection component 218(1).

At operation 908, the collision detection component 218(2) may perform second collision detection. For example, the collision detection component 218(2) may receive the secondary trajectory 118 and determine if the secondary trajectory 118 is associated with a collision with one or more objects. The determination may be based on data received from the localizer 210, the perceiver 212, and/or a component of the primary system 106 (in some cases). The collision detection component 218(2) may be communicatively coupled to the primary system 106, the trajectory validation component 220(2), and/or any other component.

At operation 910, the collision detection component 218(2) may output data regarding the second collision detection. For example, the collision detection component 218(2) may output data to the trajectory validation component 220(2) and/or the trajectory validation component 220(3) indicating if a collision is detection, a probability of a collision, etc.

At operation 912, the trajectory validation component 220(2) may receive the data from the collision detection component 218(2).

At operation 914, the trajectory validation component 220(3) may receive the data from the collision detection component 218(2).

At operation 916, the trajectory validation component 220(1) may perform one or more first validation operations. For example, the trajectory validation component 220(1) may perform one or more first validation operations with the primary trajectory 116 to determine a first state associated with the primary trajectory 116. The one or more first validation operations may be based on data from the localizer 210, the perceiver 212, the collision detection component 218(1) (e.g., the data received at operation 906), and so on. The one or more validation operations may include determining whether the primary trajectory 116 was generated less than a threshold amount of time from a current time, determining whether the primary trajectory 116 is consistent with a current or previous pose of the autonomous vehicle 102, determining whether the primary trajectory 116 is compatible with a capability of the autonomous vehicle 102, and/or determining whether the autonomous vehicle 102 moving along the primary trajectory 116 will collide with an object moving along an object trajectory. In some examples, the one or more validation operations may be performed in a particular order, such as the order in which they were described above. Here, a validation operation may not be performed if the primary trajectory 116 is determined to be invalid at any point. For instance, if the primary trajectory 116 is determined to have been generated more than a threshold amount of time ago, the primary trajectory 116 may be determined to be invalid and the other validation operations are not performed.

The trajectory validation component 220(1) may be communicatively coupled to the collision detection component 218(1), the trajectory selector 222, and/or any other component.

At operation 918, the trajectory validation component 220(1) may output the first state. For example, the trajectory validation component 220(1) may send data to the trajectory selector 222 indicating if the primary trajectory 116 is valid or invalid, a reason for being invalid (if it is), etc. In examples, the first state may indicate if the primary trajectory 116 is associated with a collision.

At operation 920, the trajectory validation component 220(2) may perform one or more second validation operations. For example, the trajectory validation component 220(2) may perform one or more second validation operations with the secondary trajectory 118 to determine a second state associated with the secondary trajectory 118. The one or more second validation operations may be based on data from the localizer 210, the perceiver 212, the collision detection component 218(2) (e.g., the data received at operation 912), and so on. In examples, the one or more second validation operations may be similar to or the same as the one or more first validation operations.

The trajectory validation component 220(2) may be communicatively coupled to the collision detection component 218(2), the trajectory selector 222, and/or any other component.

At operation 922, the trajectory validation component 220(2) may output the second state. For example, the trajectory validation component 220(2) may send data to the trajectory selector 222 indicating if the secondary trajectory 118 is valid or invalid, a reason for being invalid (if it is), etc. In examples, the second state may indicate if the secondary trajectory 118 is associated with a collision.

At operation 924, the trajectory validation component 220(3) may perform one or more third validation operations. For example, the trajectory validation component 220(3) may perform one or more third validation operations with the secondary trajectory 118 and/or a tertiary trajectory generated by the trajectory validation component 220(3) (e.g., a collision avoidance trajectory) to determine a third state associated with the secondary trajectory 118 or the tertiary trajectory. In examples, if the secondary trajectory 118 is invalid, the trajectory validation component 220(3) may generate the tertiary trajectory and perform the one or more third validation operations with the tertiary trajectory. The tertiary trajectory may include a modification to the primary trajectory 116 or the secondary trajectory 118. The one or more third validation operations may be based on data from the localizer 210, the perceiver 212, the collision detection component 218(2) (e.g., the data received at operation 914), and so on. In examples, the one or more third validation operations may be similar to or the same as the one or more first validation operations.

The trajectory validation component 220(3) may be communicatively coupled to the collision detection component 218(2), the trajectory selector 222, and/or any other component.

At operation 926, the trajectory validation component 220(3) may output the third state. For example, the trajectory validation component 220(3) may send data to the trajectory selector 222 indicating if the secondary trajectory 118 or the tertiary trajectory is valid or invalid, a reason for being invalid (if it is), and/or the modified trajectory (tertiary trajectory) itself, etc. In examples, the third state may indicate if the secondary trajectory 118 or the tertiary trajectory is associated with a collision.

At operation 928, the trajectory selector 222 may receive one or more states for trajectories. For example, the trajectory selector 222 may receive data from the trajectory validation component 220(1) indicating the first state, data from the trajectory validation component 220(2) indicating the second state, and/or data from the trajectory validation component 220(3) indicating the third state.

The trajectory selector 222 may be communicatively coupled to the trajectory validation component 220(1), the trajectory validation component 220(2), the trajectory validation component 220(3), the releasor 224, the monitor 216, the drive manager 226, and/or any other component.

At operation 930, the trajectory selector 222 may determine an output trajectory. For example, the determination may be based at least in part on the first state for the primary trajectory 116, the second state for the secondary trajectory 118, the third state for the secondary trajectory 118 or the tertiary trajectory, a signal from the monitor 216, and/or a signal from the releasor 224.

In examples, the trajectory selector 222 may select the primary trajectory 116 when the primary trajectory 116 is valid. The trajectory selector 222 may select the second trajectory 118 when (i) the primary trajectory 116 is invalid and the second trajectory is valid, or (ii) an error is reported by the monitor 216 and the secondary trajectory 118 is valid. The trajectory selector 222 may select a tertiary trajectory (e.g., collision avoidance trajectory) when (i) the primary trajectory 116 is invalid, the secondary trajectory 118 is invalid, and the tertiary trajectory is valid, (ii) an error is reported by the monitor 216, the secondary trajectory 118 is invalid, and the tertiary trajectory is valid, or (iii) the primary trajectory 116 is invalid, the secondary trajectory 118 is invalid, the tertiary trajectory is associated with a collision, the tertiary trajectory is associated with a maximum amount of deceleration/modification, and an iteration limit has not been met in applying a deceleration/modification to the tertiary trajectory. Further, the trajectory selector 222 may select a maximum deceleration trajectory (e.g., an emergency stop trajectory) if the primary trajectory 116, the secondary trajectory 118, or the tertiary trajectory are not selected.

FIG. 10 illustrates the example process 1000 that may be performed by various components of a primary system and/or a secondary system. For ease of illustration, the process 1000 is illustrated in the context of FIGS. 1 and/or 2. However, the process 1000 may be performed in other environments. In examples, the process 1000 may be performed after the process 900 is performed. In other examples, the process 1000 may be performed at other times.

At operation 1002, the trajectory selector 222 may output an output trajectory. For example, the trajectory selector 222 may output the output trajectory determined at operation 930 of FIG. 9. The output trajectory may be sent to the drive manager 226.

At operation 1004, the drive manager 226 may receive the output trajectory from the trajectory selector 222. The drive manager 226 may be communicatively coupled to the trajectory selector 222, the monitor 216, the localizer 210, and/or any other component.

At operation 1006, the drive manager 226 may control the vehicle. For example, the drive manager 226 may generate commands/instructions to control the autonomous vehicle 102 based at least in part on the output trajectory. The drive manager 226 may control steering, propulsion, braking, safety, emitters, communication, and/or other systems of the autonomous vehicle 102. In examples, the drive manager 226 may generate commands/instructions to control the autonomous vehicle 102 based on a previous trajectory for the autonomous vehicle 102, such as a trajectory that is being used to control the autonomous vehicle 102 before implementing the output trajectory. Though not illustrated here in FIG. 10, in some examples, a system controller may receive commands provided by the drive manager 226 to actuate the one or more control systems (steering, propulsion, braking, etc.).

In some examples, the drive manager 226 receives a pose of the autonomous vehicle 102 from the localizer 210. If the pose is invalid (e.g., the pose validator of the localizer 210 indicates such), the drive manager 226 may control the autonomous vehicle 102 based on a maximum deceleration trajectory (e.g., an emergency stop trajectory).

At operation 1008, the trajectory validation components 220 may output a message regarding an invalid trajectory or collision. For example, if a trajectory is invalid or is associated with a collision (e.g., in the future), any one of the trajectory validation components 220 may send a message to the primary system 106 regarding such trajectory. The message may indicate a time to collision, extents of an object, a velocity of the object, a location of the object, a point of collision, a reason for being invalid, etc.

At operation 1010, the primary system 106 may receive the message from any one of the trajectory validation components 220.

At operation 1012, the trajectory selector 222 may maintain the output trajectory. For example, if the secondary trajectory 118, a tertiary trajectory, or a maximum deceleration trajectory is output to the drive manager 226 due to an error, estimated collision, etc., the trajectory selector 222 may maintain control of the autonomous vehicle 102 based on the output trajectory (e.g., maintain control in a lower-level state). In at least some examples, this corresponds to disregarding any updated or newly provided trajectories, whereas in other examples, this corresponds to maintaining a level of the trajectory used for control. As a non-limiting example, the secondary system 108 may accept an updated primary and secondary trajectory, and use the updated secondary trajectory, despite the updated primary trajectory being valid.

At operation 1014, the releasor 224 may determine to release control of the vehicle from an output trajectory. In one example, a remote system may provide a signal to the secondary system 108 to release control from a current state, and in response, the releasor 224 may determine to release control from the current state. In another example, a component of the autonomous vehicle 102 may perform processing to determine that the autonomous vehicle 102 is clear to resume normal operation (or to transition to a different state) and send a signal to the releasor 224 to release control from a current state. The releasor 224 may be communicatively coupled to the trajectory selector 222 and/or any other component.

At operation 1016, the releasor 224 may output a signal to release control of the vehicle from the output trajectory. For example, based at least in part on the determination at operation 1014, the releasor 224 may send, to the trajectory selector 222, a signal to release control from a lower-level trajectory/state (e.g., lower than the primary trajectory 116) to a higher-level trajectory/state.

At 1018, the trajectory selector 222 may receive the signal from the releasor 224.

At operation 1020, the trajectory selector 222 may output a trajectory to the drive manager 226. For example, based at least in part on the signal received at operation 1018, the trajectory selector 222 may send, to the drive manager 226, a primary trajectory that is currently be provided by the primary system 106 (or another trajectory, in some cases).

At operation 1022, the drive manager 226 may receive the trajectory from the trajectory selector 222.

At operation 1024, the drive manager 226 may control the vehicle. For example, the drive manager 226 may generate commands/instructions to control the autonomous vehicle 102 based at least in part on the trajectory.

Figure 11:
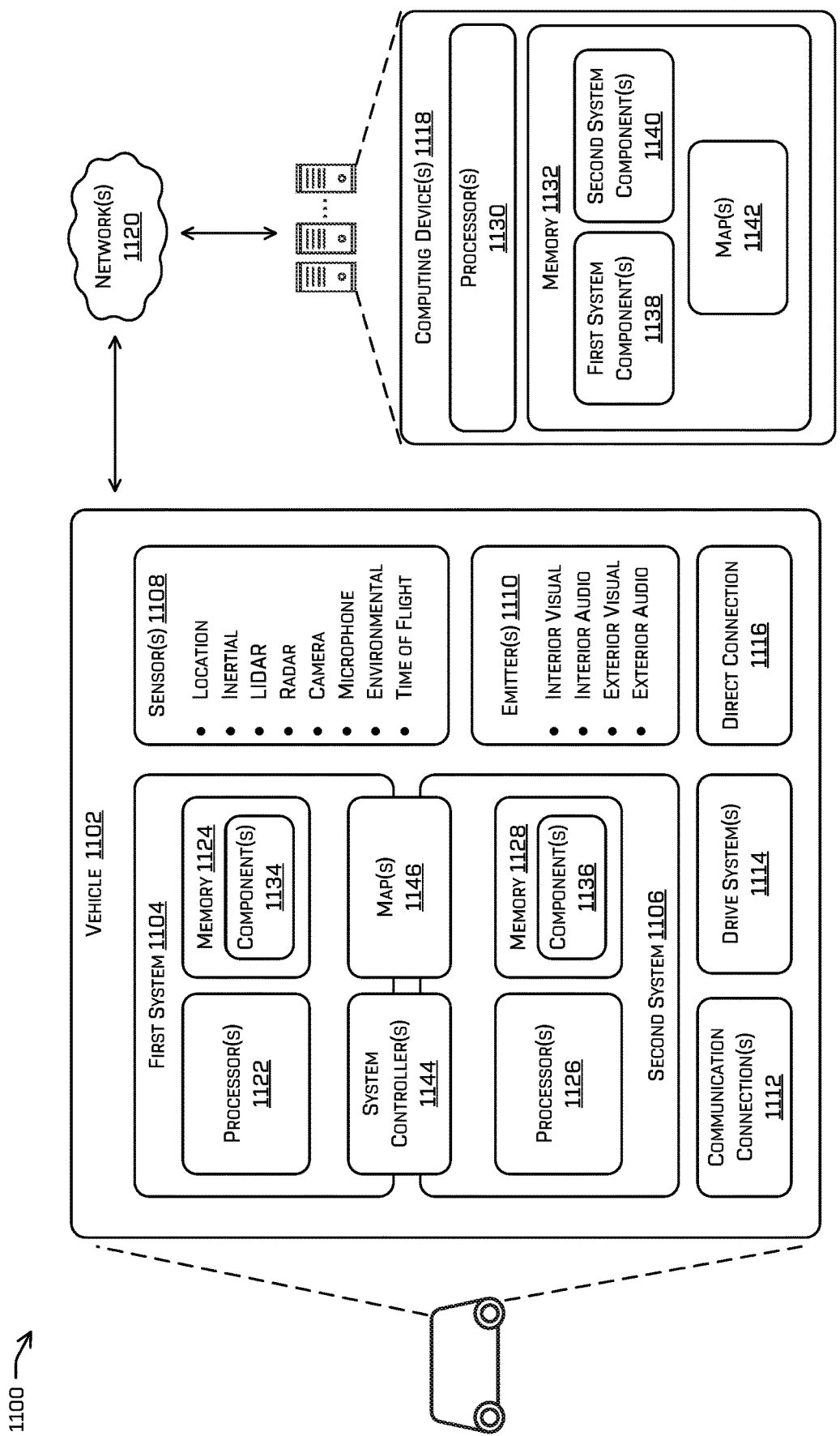
FIG. 11 depicts a block diagram of an example system for implementing the techniques described herein.

FIG. 11 depicts a block diagram of an example system 1100 for implementing the techniques described herein. In some instances, the system 1100 may include a vehicle 1102, which may correspond to the autonomous vehicle 102 in FIG. 1. In some instances, the vehicle 1102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 1102 may be a fully or partially autonomous vehicle having any other level or classification. Moreover, in some instances, the techniques described herein may be usable by non-autonomous vehicles as well.

The vehicle 1102 may include a first system 1104 (e.g., a first computing device), a second system 1106 (e.g., a second computing device), one or more sensors 1108, one or more emitters 1110, one or more communication connections 1112, one or more drive systems 1114, and/or a direct connection 1116 (e.g., for physically coupling the vehicle 1102 to exchange data and/or to provide power).

In some instances, the sensor(s) 1108 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. The sensor(s) 1108 may include multiple instances of each of these or other types of sensors. For instance, the LIDAR sensors may include individual LIDAR sensors located at the corners, front, back, sides, and/or top of the vehicle 1102. As another example, the cameras may include multiple cameras disposed at various locations about the exterior and/or interior of the vehicle 1102. The sensor(s) 1108 may provide input to the first system 1104 and/or the second system 1106.

The vehicle 1102 may also include the emitter(s) 1110 for emitting light and/or sound, as described above. The emitter(s) 1110 in this example may include interior audio and visual emitter(s) to communicate with passengers of the vehicle 1102. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 1110 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 1102 may also include the communication connection(s) 1112 that enable communication between the vehicle 1102 and one or more other local or remote computing device(s). For instance, the communication connection(s) 1112 may facilitate communication with other local computing device(s) on the vehicle 1102 and/or the drive system(s) 1114. Also, the communication connection(s) 1112 may additionally or alternatively allow the vehicle 1102 to communicate with other nearby computing device(s) (e.g., other nearby vehicles, traffic signals, etc.). The communication connection(s) 1112 may additionally or alternatively enable the vehicle 1102 to communicate with a computing device 1118.

The communication connection(s) 1112 may include physical and/or logical interfaces for connecting the first system 1104 and/or the second system 1106 to another computing device or a network, such as network(s) 1120. For example, the communication connection(s) 1112 may enable Wi-Fi-based communication such as via frequencies defined by the IEEE 800.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the first system 1104, the second system 1106, and/or the sensor(s) 1108 may send sensor data, via the network(s) 1120, to the computing device(s) 1118 at a particular frequency, after a lapse of a predetermined period of time, in near real-time, etc.

In some instances, the vehicle 1102 may include the drive system(s) 1114. In some instances, the vehicle 1102 may have a single drive system 1114. In some instances, the drive system(s) 1114 may include one or more sensors to detect conditions of the drive system(s) 1114 and/or the surroundings of the vehicle 1102. By way of example and not limitation, the sensor(s) of the drive system(s) 1114 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders may be unique to the drive system(s) 1114. In some cases, the sensor(s) on the drive system(s) 1114 may overlap or supplement corresponding systems of the vehicle 1102 (e.g., sensor(s) 1108).

The drive system(s) 1114 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 1114 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 1114. Furthermore, the drive system(s) 1114 may also include one or more communication connection(s) that enable communication by the respective drive system with one or more other local or remote computing device(s).

The first system 1104 may include one or more processors 1122 and memory 1124 communicatively coupled with the one or more processors 1122. The second system 1106 may include one or more processors 1126 and memory 1128 communicatively coupled with the one or more processors 1126. The computing device(s) 1118 may also include a processor(s) 1130 and/or memory 1132 communicatively coupled with the processor(s) 1130. The processor(s) 1122, 1126, and/or 1130 may be any suitable processor capable of executing instructions to process data and perform operations as described herein. By way of example and not limitation, the processor(s) 1122, 1126, and/or 1130 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

Memory 1124, 1128, and/or 1132 may be examples of non-transitory computer-readable media. The memory 1124, 1128, and/or 1132 may store an operating system and one or more software applications, instructions, programs, and/or data to implement the methods described herein and the functions attributed to the various systems. In various implementations, memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In examples, the memory 1124 of the first system 1104 may store one or more components 1134. For example, the first system 1104 may correspond to the primary system 106 of FIGS. 1 and 2 and store the localization component 202, the perception component 204, the prediction component 206, and/or the planning component 208. The processor(s) 1122 may execute the one or more components 1134 to cause the first system 1104 to perform various actions discussed herein.

In examples, the memory 1128 of the second system 1106 may store one or more components 1136. For example, the second system 1106 may correspond to the secondary system 108 of FIGS. 1 and 2 and store the localizer 210, the perceiver 212, the trajectory manager 214, the monitor 216, and/or the drive manager 226. The processor(s) 1126 may execute the one or more components 1136 to cause the second system 1106 to perform various actions discussed herein.

Though depicted in FIG. 11 as residing in the memory 1124 and/or the memory 1128 for illustrative purposes, it is contemplated that the component(s) 1134 and/or the component(s) 1136 may additionally, or alternatively, be accessible to the computing device(s) 1118 (e.g., stored remotely). For example, the memory 1132 may store a first system component(s) 1138 corresponding to at least a portion of the component(s) 1134 and/or store a second system component(s) 1140 corresponding to at least a portion of the component(s) 1136. Additionally, or alternatively, the memory 1132 may store one or more maps 1142.

In at least one example, the first system 1104 and/or the second system 1106 may include one or more system controllers 1144, which may be configured to control steering, propulsion, braking, safety, emitters, communication, and other systems of the vehicle 1102. In examples, the system controller(s) 1144 may be stored in the memory 1124 and/or the memory 1128. The system controller(s) 1144 may communicate with and/or control corresponding systems of the drive system(s) 1114 and/or other components of the vehicle 1102. In some instances, the system controller(s) 1144 may translate a trajectory generated by the first system 1104, generated by the second system 1106, and/or selected by the second system 1106 into instructions useable by the drive system(s) 1114 to cause the vehicle 1102 to traverse the trajectory. In some examples, the one or more system controllers 1144 may be located on a separate hardware component than the first system 1104 and/or the second system 1106.

In some instances, the first system 1104, the second system 1106, the system controller(s) 1144, and/or any component thereof may process sensor data, as described above, and may send their respective outputs, over the network(s) 1120, to the computing device(s) 1118 (e.g., at a particular frequency, after a lapse of a predetermined period of time, in near real-time, etc.)

The first system 1104 and/or the second system 1106 may store one or more maps 1146, which may be used by the vehicle 1102 to navigate within an environment. For the purpose of this discussion, a map may be any number of data features modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed. In some instances, the map may include an occupancy grid, point map, landmark map, and/or graph of pose constraints. In some instances, the vehicle 1102 may be controlled based at least in part on the map(s) 1146. That is, the map(s) 1146 may be used in conjunction with a localization component of the first system 1104 (and/or a localization component of the second system 1106 in some examples) to determine a location of the vehicle 1102, identify objects in an environment, and/or generate routes and/or trajectories to navigate within an environment.

In some instances, aspects of some or all of the components discussed herein may include any models, algorithms, and/or machine learning algorithms. For example, the component(s) 1134 in the memory 1124, the component(s) 1136 in the memory 1128, and/or the component(s) in the memory 1132 may be implemented as a neural network.

It should be noted that while FIG. 11 is illustrated as a distributed system, in alternative examples, components of the vehicle 1102 may be associated with the computing device(s) 1118 and/or components of the computing device(s) 1118 may be associated with the vehicle 1102. That is, the vehicle 1102 may perform one or more of the functions associated with the computing device(s) 1118, and vice versa.

In some examples, the one or more components 1136 (and/or the one or more components 1134) include an estimation and validation component to determine a direction of motion of the vehicle 1102, a velocity of the vehicle 1102, an acceleration of the vehicle 1102, a yaw rate of the vehicle 1102, a yaw acceleration, and/or a steering angle of the vehicle 1102. In examples, such information may be based on signals from the system controller(s) 1144, the drive system(s) 1114, etc. The estimation and validation component may generate data indicating one or more of such information and provide the data to various components of the second system 1106 and/or the first system 1104.

Further, in some examples, the one or more components 1136 (and/or the one or more components 1134) may include a data processing component(s) to filter sensor data to generate a reduced amount of data. In one example, the data processing component(s) may remove data from the sensor data that is outside a particular range. This may be based on a velocity or acceleration of the vehicle 1102, a track of an object, a velocity or acceleration of an object, etc. (e.g., remove a substantial amount of data when traveling relatively slow and remove less data when traveling relatively fast). To illustrate, if the vehicle 1102 is traveling at 15 miles per hour, and no vehicles are traveling towards the autonomous vehicle 102, the data processing component(s) may remove data that is 200 feet away, since this data is likely not needed to evaluate a trajectory or identify a potential imminent collision. In another example, the data processing component(s) may remove data from the sensor data based on a type of environment in which the vehicle 1102 is located. For example, if the vehicle 1102 is in an urban area with multiple vehicles, roads, road intersections, etc., the data processing component(s) may not remove data from the sensor data (or remove a limited amount). However, if the vehicle 1102 is in a rural area or sparse region of an urban environment with relatively few vehicles, roads, road intersections, etc., the data processing component(s) may remove more data from the sensor data. In examples, reducing the amount of the sensor data may allow the second system 1106 that may process the reduced sensor data to operate more quickly (e.g., process less data, resulting in reduced compute time).

EXAMPLE CLAUSES

A. An example vehicle system comprising: a second system communicatively coupled to a first system, the second system comprising one or more processors and memory, the second system comprising: a perceiver to: receive a portion of sensor data; determine, based at least in part on the portion of the sensor data, at least one of an object in an environment, a track for the object, or an object trajectory for the object; output data indicating at least one of a characteristic of the object, the track for the object, or the object trajectory; and a trajectory manager communicatively coupled to the perceiver, the trajectory manager to: receive a trajectory for a vehicle from the first system, the trajectory being generated by the first system based at least in part on the sensor data; receive the data from the perceiver; perform, based at least in part on the data, collision detection to determine a state associated with the trajectory; determine, based at least in part on the state associated with the trajectory, an output trajectory; and control the autonomous vehicle based at least in part on the output trajectory.

B. The vehicle system of example A, wherein the portion of the sensor data is a first portion of the sensor data, and wherein the data comprises first data and the second system further comprises: a localizer communicatively coupled to the perceiver and the trajectory manager, the localizer configured to: receive a second portion of the sensor data; determine, based at least in part on the second portion of the sensor data, a pose of the vehicle; and output, to at least one of the perceiver or the trajectory manager, second data indicating the pose of the autonomous vehicle; wherein the trajectory manager is configured to: receive the second data from the localization component; and perform the collision detection based at least in part on the second data.

C. The vehicle system of example A or B, wherein the second system further comprises: a monitor communicatively coupled to at least one of the first system or a component of the autonomous vehicle, the monitor to: monitor at least one of the first system or the component of the autonomous vehicle; determine, based at least in part on the monitoring, that an error has occurred; and output a signal indicating that the error has occurred, wherein the trajectory manager is configured to: receive the signal from the monitor; and determine the output trajectory based at least in part on the signal from the monitor.

D. The vehicle system of any of examples A through C, wherein the second system further comprises: a monitor communicatively coupled to at least one of the first system or a component of the autonomous vehicle, the monitor to: monitor at least one of the first system or the component of the autonomous vehicle; determine, based at least in part on the monitoring, that an error has occurred; and output a signal indicating that the error has occurred, a drive manager communicatively coupled to the trajectory manager, the drive manager to: receive the signal from the monitor; and control the vehicle based at least in part on a maximum deceleration trajectory.

E. The vehicle system of any of examples A through D, wherein: the trajectory comprises a first trajectory; the state associated with the first trajectory indicates that the first trajectory is associated with a collision; and the output trajectory comprises at least one of a modification of the first trajectory or a second trajectory that is associated with a maximum deceleration rate.

F. An example vehicle system comprising: a second system communicatively coupled to a first system, the second system comprising one or more processors and memory, the second system comprising: a perceiver to: receive at least a portion of sensor data; and output data indicating at least one of a characteristic of an object, a track for the object, or an object trajectory for the object; and a trajectory manager configured to: receive a first trajectory for a vehicle and a second trajectory for a vehicle from the first system; receive the data from the perceiver; perform one or more first validation operations with the first trajectory to determine a first state associated with the first trajectory; perform one or more second validation operations with the second trajectory to determine a second state associated with the second trajectory; and output, based at least in part on the first state and the second state, an output trajectory for the vehicle, the output trajectory comprising at least one of the first trajectory, the second trajectory, or a third trajectory generated by the trajectory manager.

G. The vehicle system of example F, further comprising: the first system comprising one or more additional processors and additional memory comprising instructions that, when executed by the one or more additional processors, cause the first system to: receive the sensor data from a sensor; perform, based at least in part on the sensor data, at least one of object detection, object segmentation, object classification, or object tracking for the object; and generate, based at least in part on the sensor data, the first trajectory for and the second trajectory.

H. The vehicle system of example F or G, wherein the one or more first validation operations comprises at least one of: determining whether the first trajectory was generated less than a threshold amount of time from a current time; determining whether the first trajectory is consistent with a current or previous pose of the vehicle; determining whether the first trajectory is compatible with a capability of the vehicle; or determining whether the vehicle moving along the first trajectory is associated with a collision.

I. The vehicle system of any of examples F through H, wherein the first state indicates that the first trajectory is associated with a collision, the output trajectory comprises at least one of the second trajectory or the third trajectory, and the second system further comprises: a trajectory selector to maintain control of the vehicle based at least in part on the output trajectory.

J. The vehicle system of any of examples F through I, wherein the second system further comprises: a releasor communicatively coupled to the trajectory selector, the releasor to: determine to release control of the vehicle from the output trajectory; and output a signal to the trajectory selector to release control of the vehicle from the output trajectory; wherein the trajectory selector is further configured to: receive the signal from the releasor; and output, to control the vehicle, the first trajectory, the second trajectory, or a fourth trajectory received from the first system.

K. The vehicle system of any of examples F through J, wherein the second system further comprises: a monitor configured to: monitor at least one of the first system or a component of the vehicle; determine, based at least in part on the monitoring, that an error has occurred; and output a signal indicating that the error has occurred, wherein the trajectory manager is configured to: receive the signal from the monitor; and determine the output trajectory based at least in part on the signal, the output trajectory comprising at least one of the second trajectory or the third trajectory.

L. The vehicle system of any of examples F through K, wherein: the first state indicates that the first trajectory is associated with an estimated collision; and the trajectory manager is configured to: send, to the first system and based at least in part on the first state, a message indicating one or more of a time to collision, extents of the object, a velocity of the object, a location of the object, or a point of collision; receive a fourth trajectory from the first system; perform the one or more first validation operations with the fourth trajectory; and output the fourth trajectory to control the vehicle.

M. The vehicle system of any of examples F through L, wherein: the first system implements first techniques to perform, based at least in part on the sensor data, at least one of first object detection, first object segmentation, first object classification, or first object tracking; and the second system implements second techniques to perform, based at least in part on the portion of the sensor data, at least one of second object detection, second object segmentation, second object classification, or second object tracking.

N. The vehicle system of any of examples F through M, wherein the second system further comprises: a drive manager configured to: receive the output trajectory from the trajectory manager; and control the vehicle based at least in part on the output trajectory.

O. The vehicle system of any of examples F through N, wherein the data comprises first data and the second system further comprises: a localizer to: receive the at least the portion of the sensor data; determine, based at least in part on the at least the portion of the sensor data, a pose of the vehicle; and output, to at least one of the perceiver or the trajectory management component, second data indicating the pose of the vehicle.

P. An example method comprising: determining, by a perceiver of a second component that comprises one or more processors, and based at least a portion of sensor data, perception data comprising at least one of a characteristic of an object in an environment, a track for the object, or an object trajectory for the object; receiving, by a trajectory manager of the second component, a first trajectory for a vehicle from a first component, the first component generating the first trajectory based at least in part on the sensor data; determining, by the trajectory manager and based at least in part on the perception data, a state indicative of whether the first trajectory is associated with a collision; and outputting, by the trajectory manager and based at least in part on the state, an output trajectory for the vehicle, the output trajectory comprising at least one of the first trajectory or a second trajectory generated by the trajectory manager.

Q. The method of example P, further comprising: monitoring, by a monitor of the second component, at least one of the first component or an additional component of the vehicle; determining, by the monitor and based at least in part on the monitoring, that an error has occurred; outputting, by the monitor, a signal indicating that the error has occurred; receiving, by the trajectory manager, the signal from the monitor; and determining, by the trajectory manager, the output trajectory based at least in part on the signal from the monitor.

R. The method of example P or Q, wherein the state indicates that the first trajectory is associated with a collision and the output trajectory comprises the second trajectory, and the method further comprises: maintaining, by the trajectory manager, control of the vehicle based at least in part on the output trajectory; determining, by a releasor of the second component, to release control of the vehicle from the output trajectory; and outputting, by the releasor, a signal to release control of the vehicle from the output trajectory.

S. The method of any of examples P through R, wherein the state indicates that the first trajectory is associated with a collision and the output trajectory comprises the second trajectory, the second trajectory being associated with at least one of a deceleration or a modification to the first trajectory.

T. The method of any of examples P through S, wherein the state indicates that the first trajectory is associated with an estimated collision with the object, and the method further comprises: sending, by the trajectory manager and based at least in part on the state, a message to the first component indicating one or more of a time to collision, an extent of the object, a velocity of the object, a location of the object, or a point of collision; receiving, by the trajectory manager, based at least in part on the message, and from the first system, a third trajectory for the vehicle; determining an additional state indicative of whether the third trajectory is associated with the collision or an additional collision; and outputting, based at least in part on the additional state, the third trajectory to control the vehicle.

While the example clauses described above are described with respect to particular implementations, it should be understood that, in the context of this document, the content of the example clauses can be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A vehicle system of a vehicle comprising:
a first system in the vehicle configured to receive a first portion of sensor data and determine, based on the first portion of sensor data, a trajectory for controlling the vehicle;
a second system communicatively coupled to the first system and in the vehicle, the second system comprising one or more processors and memory, the second system comprising:
a perception component configured to:
receive a second portion of sensor data;
determine, based at least in part on the second portion of the sensor data, at least one of an object in an environment, a track for the object, or an object trajectory for the object;
output object data indicating at least one of a characteristic of the object, the track for the object, or the object trajectory; and
a trajectory manager communicatively coupled to the perception component, the trajectory manager configured to:
receive the trajectory for the vehicle from the first system;
receive the object data from the perception component;
perform, based at least in part on the object data, one or more first validation operations for collision detection to determine an occurrence of an intersection event between the object and the vehicle following the trajectory, the occurrence of the intersection event indicating an error associated with the first system causing the trajectory to be unsafe for controlling the vehicle;
determine, based at least in part on the occurrence of the intersection event between the object and the vehicle following the trajectory, an output trajectory for controlling the vehicle that is different than the trajectory; and
control the vehicle based at least in part on the output trajectory,
wherein the second system is configured to send a message to the first system, the message including an indication of the error associated with the first system based on the occurrence of the intersection event caused by the trajectory.

2. The vehicle system of claim 1, wherein the first portion of the sensor data comprises first data and the second system further comprises:
a localizer communicatively coupled to the perception component and the trajectory manager, the localizer configured to:
receive the second portion of sensor data;
determine, based at least in part on the second portion of the sensor data, a pose of the vehicle; and
output, to at least one of the perception component or the trajectory manager, second data indicating the pose of the vehicle;
wherein the trajectory manager is configured to:
receive the second data from the localizer; and
perform the collision detection based at least in part on the second data.

3. The vehicle system of claim 1, wherein the second system further comprises:
a monitor communicatively coupled to at least one of the first system or a component of the vehicle, the monitor configured to:
monitor at least one of the first system or the component of the vehicle;
determine, based at least in part on monitoring the at least one of the first system or the component of the vehicle, that the error has occurred; and
output a signal indicating that the error has occurred,
wherein the trajectory manager is configured to:
receive the signal from the monitor; and
determine the output trajectory based at least in part on the signal from the monitor.

4. The vehicle system of claim 1, wherein the second system further comprises:
a monitor communicatively coupled to at least one of the first system or a component of the vehicle, the monitor configured to:
monitor at least one of the first system or the component of the vehicle;
determine, based at least in part on monitoring the at least one of the first system or the component of the vehicle, that the error has occurred; and
output a signal indicating that the error has occurred; and
a drive manager communicatively coupled to the trajectory manager, the drive manager configured to:
receive the signal from the monitor; and
control the vehicle based at least in part on a maximum deceleration trajectory.

5. The vehicle system of claim 1, wherein:
the trajectory comprises a first trajectory;
the one or more first validation operations indicate that the first trajectory is associated with a collision; and
the output trajectory comprises at least one of a modification of the first trajectory or a second trajectory that is associated with a maximum deceleration rate of the vehicle from among deceleration rates available to the vehicle.

6. A vehicle system comprising:
a first system in a vehicle configured to determine a first trajectory for controlling the vehicle and a second trajectory for controlling the vehicle;
a second system communicatively coupled to the first system and in the vehicle, the second system comprising one or more processors and memory, the second system comprising:
a first subsystem configured to:
receive at least a portion of sensor data; and
output object data indicating at least one of a characteristic of an object, a track for the object, or an object trajectory for the object; and
a second subsystem configured to:
receive the first trajectory for the vehicle and the second trajectory for the vehicle from the first system;
receive the object data from the first subsystem;
perform one or more first validation operations with the first trajectory to determine an occurrence of an intersection event between the object and the vehicle following the first trajectory, the occurrence of the intersection event indicating an error associated with the first system causing the first trajectory to be unsafe for controlling the vehicle;
perform one or more second validation operations with the second trajectory; and
output, based at least in part on the occurrence of the intersection event between the object and the vehicle following the first trajectory, an output trajectory for controlling the vehicle, the output trajectory comprising at least one of the second trajectory or a third trajectory generated by the second subsystem that is different than the first trajectory,
wherein the second system is configured to send a message to the first system, the message including an indication of the error associated with the first system based on the occurrence of the intersection event caused by the first trajectory.

7. The vehicle system of claim 6, further comprising:
the first system comprising one or more additional processors and additional memory comprising instructions that, when executed by the one or more additional processors, cause the first system to:
receive the sensor data from a sensor;
perform, based at least in part on the sensor data, at least one of object detection, object segmentation, object classification, or object tracking for the object; and
generate, based at least in part on the sensor data, the first trajectory and the second trajectory.

8. The vehicle system of claim 6, wherein the one or more second validation operations comprises at least one of:
determining whether the first trajectory was generated less than a threshold amount of time from a current time;
determining whether the first trajectory is consistent with a current or previous pose of the vehicle;
determining whether the first trajectory is compatible with a capability of the vehicle; or
determining whether the vehicle moving along the first trajectory is associated with a collision.

9. The vehicle system of claim 6, wherein the second system further comprises a third subsystem to maintain control of the vehicle based at least in part on the output trajectory.

10. The vehicle system of claim 9, wherein the second system further comprises:
a fourth subsystem communicatively coupled to the second subsystem, the fourth subsystem configured to:
determine to release control of the vehicle from the output trajectory; and output a signal to the third subsystem to release control of the vehicle from the output trajectory;
wherein the third subsystem is further configured to:
receive the signal from the fourth subsystem; and
output, to control the vehicle, the first trajectory, the second trajectory, or a fourth trajectory received from the first system.

11. The vehicle system of claim 6, wherein the second system further comprises:
a third subsystem configured to:
monitor at least one of the first system or a component of the vehicle;
determine, based at least in part on monitoring the at least one of the first system or the component of the vehicle, that the error has occurred; and
output a signal indicating that the error has occurred,
wherein the second subsystem is configured to:
receive the signal from the third subsystem; and
determine the output trajectory based at least in part on the signal.

12. The vehicle system of claim 6, wherein the second subsystem is configured to:
send, to the first system and based at least in part on validating the first trajectory, a message indicating one or more of a time to collision, extents of the object, a velocity of the object, a location of the object, or a point of collision;
receive a fourth trajectory from the first system;
perform the one or more first validation operations with the fourth trajectory; and
output the fourth trajectory to control the vehicle.

13. The vehicle system of claim 6, wherein:
the first system implements first techniques to perform, based at least in part on the sensor data, at least one of first object detection, first object segmentation, first object classification, or first object tracking; and
the second system implements second techniques to perform, based at least in part on the portion of the sensor data, at least one of second object detection, second object segmentation, second object classification, or second object tracking.

14. The vehicle system of claim 6, wherein the second system further comprises:
a third subsystem configured to:
receive the output trajectory from the second subsystem; and
control the vehicle based at least in part on the output trajectory.

15. The vehicle system of claim 6, wherein the portion of the sensor data comprises first data and the second system further comprises:
a third subsystem configured to:
receive the portion of the sensor data;
determine, based at least in part on the portion of the sensor data, a pose of the vehicle; and
output, to at least one of the first subsystem or the second subsystem, second data indicating the pose of the vehicle.

16. A method comprising:
determining, by a first system in a vehicle, a first trajectory for controlling the vehicle, the first system generating the first trajectory based at least in part on sensor data;
determining, by a first subsystem of a second system in the vehicle that comprises one or more processors, and based at least in part on a portion of the sensor data, perception data comprising at least one of a characteristic of an object in an environment, a track for the object, or an object trajectory for the object;
receiving, by a second subsystem of the second system, the first trajectory for controlling the vehicle from the first system;
determining, by the second subsystem and based at least in part on the perception data, a validation indicative of whether the first trajectory is associated with an occurrence of a collision between the object and the vehicle following the first trajectory, the occurrence of the collision indicating an error associated with the first system causing the first trajectory to be unsafe for controlling the vehicle;
outputting, by the second subsystem and based at least in part on the occurrence of the collision between the object and the vehicle following the first trajectory, an output trajectory for controlling the vehicle, the output trajectory comprising a second trajectory generated by the second subsystem that is different than the first trajectory; and
sending, by the second system and to the first system, a message, the message including an indication of the error associated with the first system based on the occurrence of the collision caused by the first trajectory.

17. The method of claim 16, further comprising:
monitoring, by a third subsystem of the second system, at least one of the first system or an additional component of the vehicle;
determining, by the third subsystem and based at least in part on monitoring the at least one of the first system or the additional component of the vehicle, that the error has occurred;
outputting, by the third subsystem, a signal indicating that the error has occurred;
receiving, by the second subsystem, the signal from the third subsystem; and
determining, by the second subsystem, the output trajectory based at least in part on the signal from the third subsystem.

18. The method of claim 16, further comprising:
maintaining, by the second subsystem, control of the vehicle based at least in part on the output trajectory;
determining, by a third subsystem of the second system, to release control of the vehicle from the output trajectory; and
outputting, by the third subsystem, a signal to release control of the vehicle from the output trajectory.

19. The method of claim 16, wherein the second trajectory is associated with at least one of a deceleration or a modification to the first trajectory.

20. The method of claim 16, further comprising:
sending, by the second subsystem and based at least in part on the validation, a message to the first system indicating one or more of a time to collision, an extent of the object, a velocity of the object, a location of the object, or a point of collision;
receiving, by the second subsystem, based at least in part on the message, and from the first system, a third trajectory for the vehicle;
determining an additional validation indicative of whether the third trajectory is associated with the collision or an additional collision; and
outputting, based at least in part on the additional validation, the third trajectory to control the vehicle.

* * * * *